(12) United States Patent
Nishida

(10) Patent No.: US 12,097,869 B2
(45) Date of Patent: Sep. 24, 2024

(54) CHANGING OPERATION ASSISTING APPARATUS

(71) Applicant: TOYOTA JIDOSHA KABUSHIKI KAISHA, Toyota (JP)

(72) Inventor: Takashi Nishida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/330,107

(22) Filed: Jun. 6, 2023

(65) Prior Publication Data

US 2023/0311913 A1 Oct. 5, 2023

Related U.S. Application Data

(63) Continuation of application No. 16/774,830, filed on Jan. 28, 2020.

(30) Foreign Application Priority Data

Jan. 30, 2019 (JP) .................................. 2019-014737

(51) Int. Cl.
*B60W 50/08* (2020.01)
*B60W 30/08* (2012.01)
(Continued)

(52) U.S. Cl.
CPC .......... *B60W 50/085* (2013.01); *B60W 30/08* (2013.01); *B60W 30/12* (2013.01);
(Continued)

(58) Field of Classification Search
CPC .... B60W 50/085; B60W 30/08; B60W 30/12; B60W 30/165
See application file for complete search history.

(56) References Cited

U.S. PATENT DOCUMENTS

2004/0088084 A1 6/2004 Geisler
2012/0306637 A1* 12/2012 McGough .............. B60K 35/10
340/439
(Continued)

FOREIGN PATENT DOCUMENTS

JP 2016-197390 A 11/2016
JP 2018-75873 A 5/2018

*Primary Examiner* — Imran K Mustafa
(74) *Attorney, Agent, or Firm* — Sughrue Mion, PLLC

(57) ABSTRACT

A changing operation assisting apparatus includes a driving assistance control section, an operation section, and an information providing section. The driving assistance control section stores set states regarding driving assistance functions of a vehicle and provides the functions in accordance with the set sates. The set state includes a request state of the function. The operation section is used for changing the set state. The information providing section provides information regarding the set state to a driver of the vehicle. Further, the driving assistance control section executes a setting change confirmation processing upon satisfaction of a specific condition. The setting change confirmation processing is a process of providing confirmation information to confirm whether or not to change the request state of the function, and changing the request state of the function when the driver performs an approving operation in accordance with the confirmation information.

2 Claims, 22 Drawing Sheets

| | DRIVE ASSISTANCE FUNCTION | Operation Stopping Confirmation Target Functions | Candidates of Suggestion Target Functions | Other Candidates of Suggestion Target Functions |
|---|---|---|---|---|
| 1 | PRE-CRUSH SAFETY | O | | |
| 2 | LANE TRACING ASSIST | | O | |
| 3 | ROAD SIGN ASSIST | | | |
| 4 | RADAR CRUISE CONTROL | | O | |
| 5 | PRECEDING VEHICLE START NOTIFICATION | | | |
| 6 | BLIND SPOT MONITORING | O | O | |
| 7 | CLEARANCE SONAR | O | | O |
| 8 | REAR CROSS TRAFFIC ALARM | O | | O |
| 9 | PARKING SUPPORT BRAKE | | | O |

Cm1  Cm2  Cm3

(51) Int. Cl.
  *B60W 30/12* (2020.01)
  *B60W 30/165* (2020.01)
  *B60W 50/00* (2006.01)

(52) U.S. Cl.
  CPC ... *B60W 30/165* (2013.01); *B60W 2050/0063* (2013.01); *B60W 2540/30* (2013.01)

(56) References Cited

U.S. PATENT DOCUMENTS

| | | |
|---|---|---|
| 2018/0033327 A1* | 2/2018 | Nishijima .............. G09B 9/042 |
| 2018/0059905 A1* | 3/2018 | Ho ......................... B60K 35/10 |
| 2018/0118223 A1 | 5/2018 | Mori et al. |
| 2018/0126990 A1 | 5/2018 | Shimada et al. |
| 2019/0315374 A1 | 10/2019 | Ho |

\* cited by examiner

FIG.5

| | DRIVE ASSISTANCE FUNCTION | Operation Stopping Confirmation Target Functions | Candidates of Suggestion Target Functions | Other Candidates of Suggestion Target Functions |
|---|---|---|---|---|
| 1 | PRE-CRUSH SAFETY | ○ | | |
| 2 | LANE TRACING ASSIST | | ○ | |
| 3 | ROAD SIGN ASSIST | | | |
| 4 | RADAR CRUISE CONTROL | | ○ | |
| 5 | PRECEDING VEHICLE START NOTIFICATION | | | |
| 6 | BLIND SPOT MONITORING | ○ | ○ | |
| 7 | CLEARANCE SONAR | ○ | | ○ |
| 8 | REAR CROSS TRAFFIC ALARM | ○ | | ○ |
| 9 | PARKING SUPPORT BRAKE | | | ○ |
| | | ↑ Cm1 | ↑ Cm2 | ↑ Cm3 |

CHANGING OPERATION ASSISTING APPARATUS

CROSS-REFERENCE TO RELATED APPLICATION

This application is a Continuation Application of U.S. application Ser. No. 16/774,830 filed on Jan. 28, 2020, which claims priority to Japanese Patent Application No. 2019-014737 filed on Jan. 30, 2019.

TECHNICAL FIELD

The present disclosure relates to a changing operation assisting apparatus which assists a driver in changing set states of driving assistance functions provided by a vehicle.

BACKGROUND

There has been known a vehicle which includes a driving assistance (supporting) system for providing driving assistance functions for assisting a driver in driving. Examples of the driving assistance functions include a radar cruise control (RCC) function, a lane tracing assist (or a lane keeping assist) function, a preceding vehicle start notification function, and an autonomous driving function.

The driving assistance system is configured to allow the driver to activate and deactivate some driving assistance functions. Further, the driving assistance system is configured to allow the driver to set and change control parameters necessary for assisting operations provided by the driving assistance system (for example, a control parameter designating a target inter-vehicular distance for the RCC function). In a case where the driving assistance system is configured to provide a large number of types of driving assistance functions and/or in a case where the number of settable and changeable items (such as the control parameters) of each driving assistance function is large, driver's operations necessary for changing the set state of each driving assistance function may become cumbersome.

In view of the above, one of conventional changing operation assisting apparatuses (hereinafter also referred to as the "conventional apparatus") is configured such that, when the driver operates a first switch, the conventional apparatus activates the autonomous driving function if the vehicle is in a condition in which the vehicle can provide the autonomous driving function. Meanwhile, if the vehicle is in a condition in which the vehicle cannot provide the autonomous driving function when the driver operates the first switch, the conventional apparatus activates another driving assistance function whose level of assistance is lower than that of the autonomous driving function.

According to the conventional apparatus, since activation of the two driving assistance functions can be instructed through a single operation on a single switch, the number of switches used for changing the set states of the driving assistance functions can be reduced. Therefore, the conventional apparatus can simplify the operation necessary for changing the set states of the driving assistance functions (see, for example, Japanese Patent Application Laid-Open (kokai) No. 2018-75873).

SUMMARY

Incidentally, there is a possibility that the driver erroneously operates an operation switch (for example, the above-described first switch) for changing the set state of a certain driving assistance function. In addition, there is a possibility that the driver operates an operation switch in a state in which the driver has not correctly understood a "setting item which is changed through an operation of the operation switch."

Therefore, due to such a driver's erroneous operation or misunderstanding, the set state (for example, a request state which is either of an OFF state and an ON state) of a certain driving assistance function may be changed against the driver's will (intention). If the request state of a certain driving assistance function is the OFF state, that driving assistance function is not executed even in a situation where it is desirable that that driving assistance function is executed. Namely, execution of the driving assistance of that driving assistance function is prohibited. Meanwhile, when the request state of the certain driving assistance function is the ON state, that driving assistance function is executed upon occurrence of a situation where that driving assistance function can be executed. Namely, execution of the driving assistance by that driving assistance function is permitted.

However, in the conventional apparatus, no consideration has been given to prevention of changing (namely, erroneous setting) of the request state of a driving assistance function, which changing would otherwise occur against the driver's will due to his/her erroneous operation or misunderstanding.

In view of the above, one object of the present disclosure is to provide a changing operation assisting apparatus which can avoid (prevent) the occurrence of erroneous setting of the request state regarding a driving assistance function, which erroneous setting would otherwise occur due to a driver's erroneous operation or misunderstanding.

A changing operation assisting apparatus for achieving the above-described object (hereinafter also referred to as the "apparatus of the present disclosure") comprises a driving assistance control section, an operation section, and an information providing section. The driving assistance control section may be implemented by at least one programmed processor whose operation is determined by a predetermined program, gate arrays and the like.

The driving assistance control section (a driving assistance ECU 20) is configured to store a "set state" regarding each of driving assistance functions of a vehicle (10), the set state including a "request state which is either one of an OFF state and an ON state," and to provide the driving assistance functions in accordance with each of the set states.

The operation section (an operation switches 60) is used for an "operation" by a driver of the vehicle for changing the set state, and is configured to output, to the driving assistance control section, information regarding the operation performed by the driver. The operation includes a predetermined "request state changing operation" performed so as to change the request state.

The information providing section (a display 27) is configured to be controlled by the driving assistance control section and provide information regarding the set state to the driver.

Furthermore, the driving assistance control section executes a "setting change confirmation processing" upon satisfaction of a predetermined "specific condition" (i.e., when the specific condition becomes satisfied).

The setting change confirmation processing is a process of controlling the information providing section to provide, to the driver, "confirmation information" to confirm whether to change the request state of a "confirmation target function" among the driving assistance functions, and of changing the request state of the confirmation target function when the driver performs a predetermined "approving operation" by using the operation section in accordance with the confirmation information.

In a case where the specific condition has been satisfied (namely, the setting change confirmation processing has been executed), the request state of the confirmation target function is changed when the driver performs the approving operation in accordance with the confirmation information provided by the information providing section. Namely, the request state of the confirmation target function is switched between the OFF state and the ON state. In other words, in a case where the driver has erroneously performed the request state changing operation or in a case where the driver misunderstood the procedure of the request state changing operation, the driver does not perform the approving operation, and consequently, the request state is not changed. Accordingly, the apparatus of the present disclosure can avoid (prevent) the occurrence of erroneous setting of the request state regarding a driving assistance function, which erroneous setting would otherwise occur due to a driver's erroneous operation or misunderstanding.

In one mode (first mode) of the apparatus of the present disclosure, the driving assistance control section is configured to determine that the specific condition is satisfied upon satisfaction of a condition which is satisfied when the driver has performed, to the operation section, a predetermined "similar operation" which is different from (but similar to) the request state changing operation for changing "the request state of the confirmation target function" to the ON state. The similar operation is an operation which is apt (likely) to be performed by the driver (due to his/her erroneous operation or misunderstanding) so as to change the request state to the ON state (a "Yes" determination in step 1920 of FIG. 19).

When the driver performs the similar operation different from the request state changing operation for changing the request state of a certain driving assistance function (specifically, the confirmation target function), the setting change confirmation processing is executed. In addition, when the driver performs the approving operation during execution of the setting change confirmation processing, the request state of the confirmation target function is changed. Accordingly, in the first mode, even in a case where the driver performs the similar operation due to his/her erroneous operation or misunderstanding, the driver can change the request state of the confirmation target function to a desired state by performing the approving operation.

In another mode (second mode) of the apparatus of the present disclosure, the driving assistance control section is configured to determine that the specific condition is satisfied upon satisfaction of a condition which is satisfied when the driver has performed, for the confirmation target function, the request state changing operation for changing "the request state of the driving assistance function" to the OFF state (a "Yes" determination in step 2015 of FIG. 20).

In some cases, the driving assistance control section provides a driving assistance function whose request state is desirably maintained in the ON state unless there is a special reason. In a case where such a driving assistance function has been selected in advance as the confirmation target function, even when the driver performs an operation of changing the request state of the confirmation target function to the OFF state (namely, the request state changing operation), the request state is not changed to the OFF state unless the driver further performs the approving operation. Accordingly, in the second mode, erroneously changing of the request state of the confirmation target function to the OFF state can be avoided.

In still another mode (third mode) of the apparatus of the present disclosure, the driving assistance control section is configured to determine that the specific condition is satisfied upon satisfaction of a condition which is satisfied when the request state changing operation is performed so as to change the request state of "the driving assistance function, which has been related to the confirmation target function in advance and is different from the confirmation target function," to the ON state while the request state of the confirmation target function has been the OFF state (a "Yes" determination in step 2120 of FIG. 21).

In some cases, a certain driving assistance function (function A) is executed under the assumption that another driving assistance function (function B) is being executed. In another case, the range of application of a certain driving function (function A) is expanded if another driving assistance function (function B) is being executed. In those cases, for the sake of convenience, the function B will also be referred to as a "prerequisite function" for the function A.

In a case where the prerequisite function (the function B in this example) for the function A has been stored as the confirmation target function which relates to the function A, the setting change confirmation processing is executed when the driver performs an operation of changing the request state of the function A to the ON state (namely, the request state changing operation) while the request state of the prerequisite function (the function B) has been the OFF state. In addition, when the driver performs the approving operation during execution of the setting change confirmation processing, the request state of the prerequisite function (the function B) is switched to the ON state. Accordingly, in the third mode, in a case where the driver has forgotten (failed) to switch the request state of the prerequisite function (the function B) to the ON state (before the driver performs the operation of changing the request state of the function A to the ON state) or in a case where the driver does not know the presence of the prerequisite function, the request state of the prerequisite function can be easily switched to the ON state.

In still another mode (fourth mode) of the apparatus of the present disclosure, the driving assistance control section is configured to determine that the specific condition is satisfied upon satisfaction of a condition which is satisfied when a traveling state of the vehicle corresponds to (becomes) "a specific traveling state previously determined for the confirmation target function" while the request state of the confirmation target function has been the OFF state (a "Yes" determination in step 2220 of FIG. 22).

In some cases, the driving assistance control section can provide a driving assistance function (referred to as a traveling state related function) which is particularly useful when the traveling state of the vehicle corresponds to (becomes) the specific traveling state. In a case where the traveling state related function is the confirmation target function, when the traveling state of the vehicle becomes the specific traveling state in a state in which the request state of the traveling state related function has been the OFF state, the setting change confirmation processing is performed for the traveling state related function. In addition, when the driver performs the approving operation during execution of the setting change confirmation processing, the request state of the traveling state related function is switched to the ON state. Accordingly, in the fourth mode, in a case where the driver has forgotten (failed) to switch the request state of the traveling state related function to the ON state (before the traveling state of the vehicle becomes the specific traveling state) or in a case where the driver does not understand the usefulness of the traveling state related function (for the specific traveling state), the request state of the traveling state related function can be easily switched to the ON state.

In still another mode (fifth mode) of the apparatus of the present disclosure, the driving assistance control section is configured to determine that the specific condition is satisfied upon satisfaction of a condition which is satisfied when the request state changing operation corresponding to the confirmation target function is performed.

It is desired that the required (necessary) procedure of the setting change operation is simple. However, when the procedure is excessively simple, the possibility that the driver erroneously changes the request state of the driving assistance function is too high. In contrast, in the fifth mode, the setting change confirmation processing is executed before the request state of the driving assistance function is changed. Thus, in a case where a "driving assistance function whose setting can be changed through a simple procedure" is the confirmation target function as well, the setting change confirmation processing is executed. Accordingly, in the fifth mode, erroneous changing of the request state of the driving assistance function can be avoided (prevented).

In still another mode (sixth mode) of the apparatus of the present disclosure, the driving assistance control section is configured such that, in a case where the setting change confirmation processing has been executed after an ignition-ON operation of the vehicle is performed, the driving assistance control section does not execute the setting change confirmation processing again before an ignition-OFF operation of the vehicle is performed, even when the specific condition is satisfied (a "No" determination in step 1925 of FIG. 19).

A period between a point in time when an ignition switch of the vehicle is turned on (namely, when the ignition-ON operation is performed) and a point in time when the ignition switch is turned off (namely, when the ignition-OFF operation is performed) is referred to as a "trip." In the sixth mode, repeated execution of the setting change confirmation processing for the confirmation target function in the same/single trip is avoided (prohibited). In addition, in a case where the apparatus of the present disclosure executes a plurality of types of setting change confirmation processing (namely, a plurality of specific conditions are present, and the setting change confirmation processing is executed for each of the specific conditions), repeated execution of the setting change confirmation processing of the same type (corresponding to a single specific condition) in the same (single) trip is avoided (prohibited). Accordingly, in the sixth mode, it is possible to avoid a situation in which the driver feels a sense of bother or troublesome since the setting change confirmation processing is executed a plurality of times in the same (single) trip.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

BRIEF DESCRIPTION OF THE DRAWINGS

FIG. 5 is a table showing a list of driving assistance functions which the present assisting apparatus provides;

DETAILED DESCRIPTION

Figure 1:
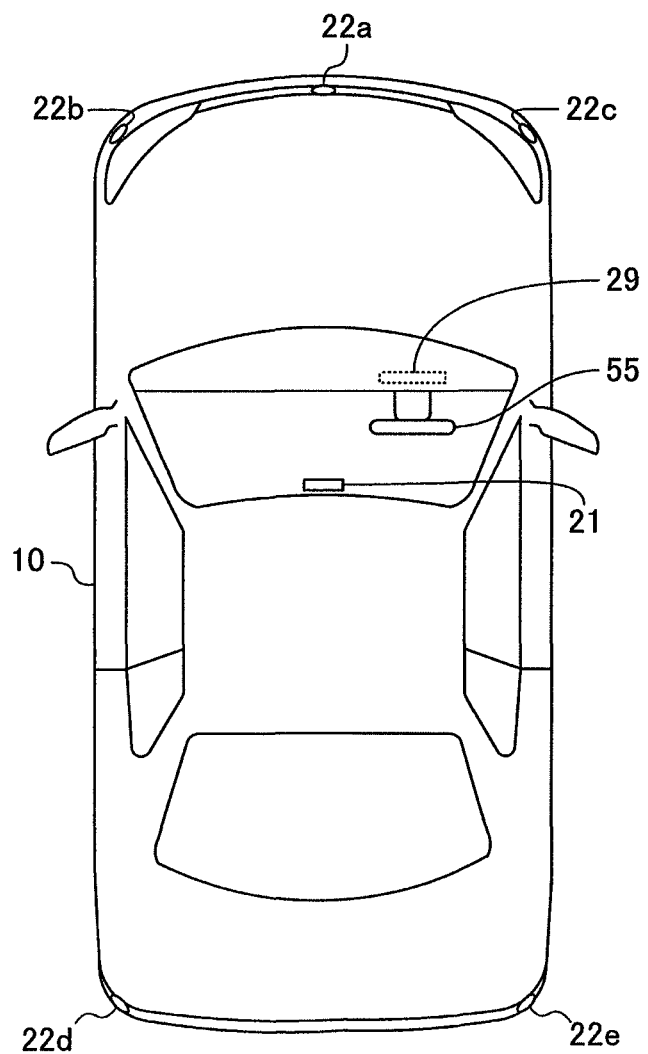
FIG. 1 is a schematic diagram of a vehicle (present vehicle) in which a changing operation assisting apparatus according to an embodiment of the present disclosure (present assisting apparatus) is installed.

A changing operation assisting apparatus (hereinafter also referred to as the "present assisting apparatus") according to an embodiment of the present disclosure will now be described with reference to the drawings. The present assisting apparatus is applied to a vehicle 10 shown in FIG. 1. In addition, a block diagram of the vehicle 10 is shown in FIG. 2. The present assisting apparatus includes "a drive assistance ECU 20, an engine ECU 31, a brake ECU 32, and an EPS-ECU 33" each of which is an electronic control unit (ECU).

The drive assistance ECU 20 includes a micro-computer, as a major component, which includes a CPU, a non-volatile memory, and a RAM. The CPU performs data reading, numerical computation, computation result output, and so on by repeatedly executing predetermined programs (routines). The non-volatile memory is formed by a flash memory and stores the programs executed by the CPU, lookup tables (maps) read by the CPU during execution of the programs, set states of driving assistance functions described later, and the like. The RAM temporarily stores data read by the CPU.

Each of the engine ECU 31, the brake ECU 32, and the EPS-ECU 33 includes a micro-computer as a major component, similarly to the drive assistance ECU 20. These ECUs can perform data communication (can exchange data) with one another through a CAN (controller area network) 34. In addition, each ECU can receive "output values of a sensor connected to one of the other ECUs" from that ECU to which the sensor is connected through the CAN 34.

The drive assistance ECU 20 is connected to a front camera 21, millimeter wave radars 22, a vehicle speed sensor 23, an acceleration sensor 24, a GPS receiving section 25, a map database 26, a multi information display 27, and a speaker 28.

The front camera 21 (see FIG. 1) captures (takes) an image of a region in front of the vehicle 10 (hereinafter also referred to as "a front image") and outputs signals representing the front image to the drive assistance ECU 20 every time a predetermined time elapses.

Figure 2:
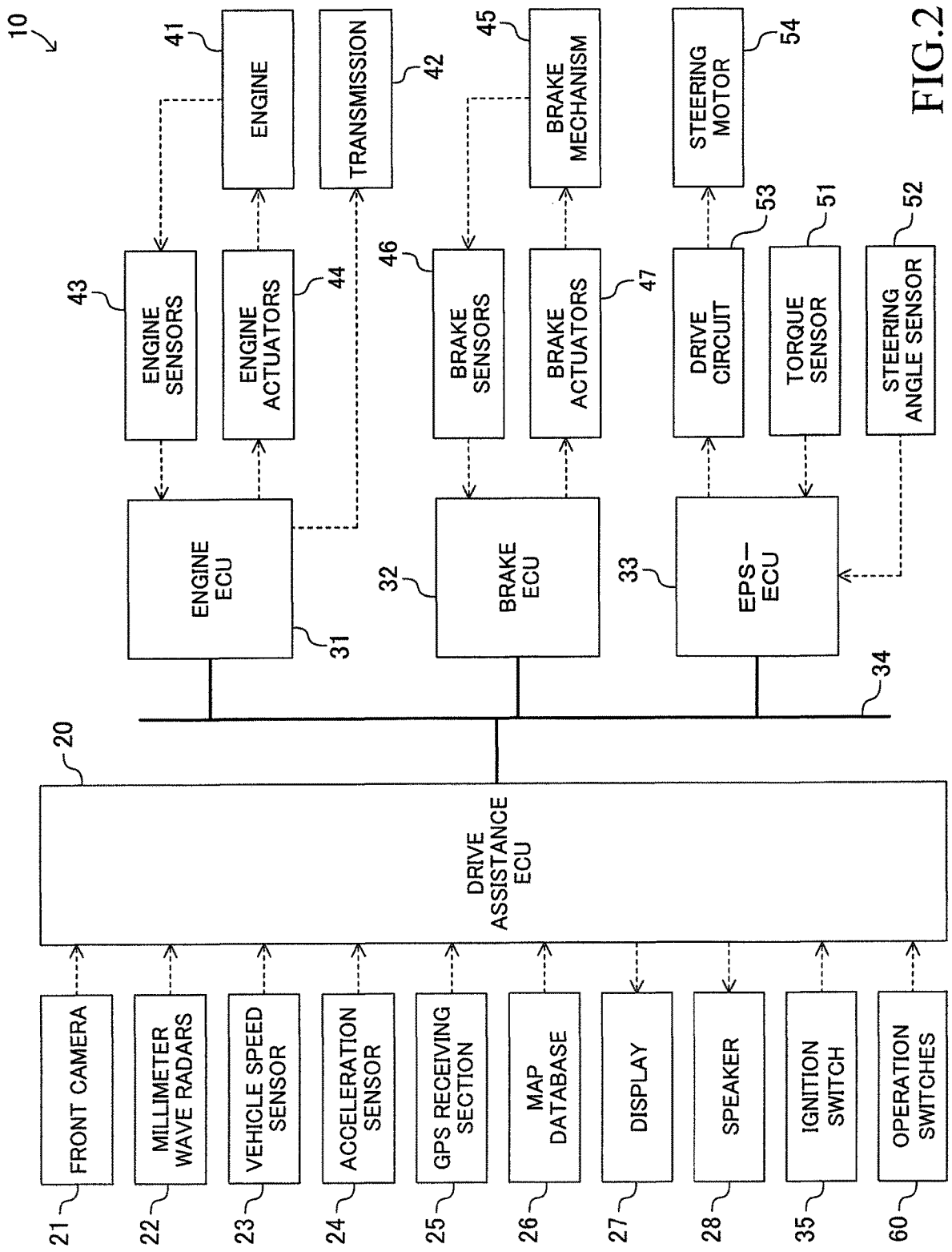
FIG. 2 is a block diagram of the present vehicle.

As shown in FIG. 1, the millimeter wave radars 22 includes a front center radar 22a, a front left radar 22b, a front right radar 22c, a rear left radar 22d, and a rear right radar 22e, each of which is a radar unit.

The front center radar 22a detects a target in a region located forward (ahead) of the vehicle 10. The front left radar 22b detects a target in a region located forward and leftward of the vehicle 10. The front right radar 22c detects a target in a region located forward and rightward of the vehicle 10. The rear left radar 22d detects a target in a region located backward and leftward of the vehicle 10. The rear right radar 22e detects a target in a region located backward and rightward of the vehicle 10.

Each of the radar units contained in the millimeter wave radars 22 transmits (radiates) a radio wave of the millimeter wave band and receives "a reflected wave of the transmitted wave" generated by a target so as to obtain information as "target information" which represents a direction, a distance, a relative speed, and so on of the target with respect to the vehicle 10. In addition, each of the radar units outputs the target information to the drive assistance ECU 20 every time a predetermined time elapses.

The vehicle speed sensor 23 detects a vehicle speed Vt which is the travel speed of the vehicle 10 and outputs a signal indicative of the vehicle speed Vt to the drive assistance ECU 20. The acceleration sensor 24 detects an acceleration As of the vehicle 10 in the longitudinal direction and outputs a signal indicative of the acceleration As to the drive assistance ECU 20.

The GPS receiving section 25 obtains a present position Pn of the vehicle 10 on the basis of signals (radio waves) from global positioning satellites (in the present embodiment, the GPS (Global Positioning System) satellites) and outputs a signal representing the present position Pn to the drive assistance ECU 20.

The map database 26 is formed by a hard disk drive (HDD) and stores a map data. The map database 26 includes (retains) information (map information) regarding "nodes," "links" and "facilities." The nodes are intersections, dead ends, and so on. The links are roads, each connecting between the nodes. The facilities are buildings, parking lots (car parks), and so on, located along the links. In addition, the map information regarding the links includes road categories (in the present embodiment, any one of ordinary road, expressway, and limited highway including freeway exclusively for motor vehicles).

Figure 3:
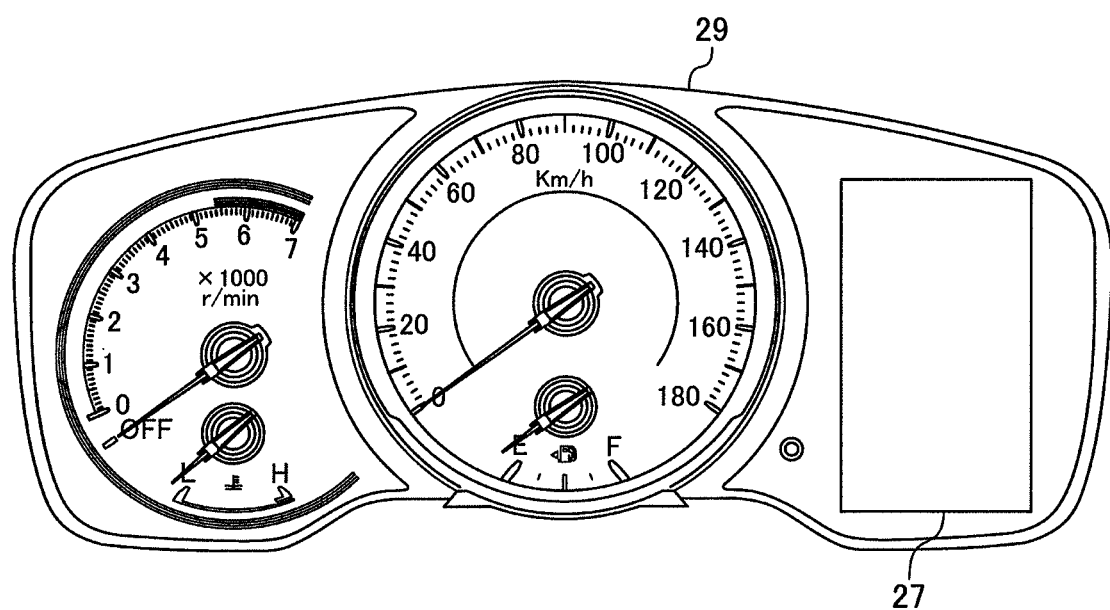
FIG. 3 is an illustration showing an instrument panel in which a display section of the present assisting apparatus is arranged.

The multi information display 27 is disposed in an instrument panel 29 shown in FIG. 3. The instrument panel 29 is mounted at a position which a driver of the vehicle 10 can view (namely, in front of the driver, see FIG. 1) and notifies the driver of driving status of the vehicle 10. The multi information display 27 is also referred to as the display 27 for simplification.

The display 27 comprises a LCD (liquid crystal display). Characters, figures, and so on, to be displayed on the display 27 are controlled by the drive assistance ECU 20. In addition, as described later, execution status of the driving assistance functions is displayed on the display 27.

The speaker 28 is disposed inside a vehicle compartment of the vehicle 10. A warning sound and a voice message to be played (generated) by the speaker 28 are controlled by the drive assistance ECU 20. The drive assistance ECU 20 makes (lets) the speaker 28 reproduce a predetermined beep sound as necessary, when a screen displayed on the display 27 is switched over and when the driver operates an operation switches 60 described later.

In addition, the drive assistance ECU 20 is connected to an ignition switch 35. In the present embodiment, the ignition switch 35 is a push button. An operation to the ignition switch 35 performed when the operation state of the drive assistance ECU 20 is an OFF state is also referred to as an "ignition-ON operation." When the ignition-ON operation is performed, the operation state of the drive assistance ECU 20 is switched to an ON state.

In addition, when the ignition-ON operation is performed, the drive assistance ECU 20 switches each of the operation states of the engine ECU 31, the brake ECU 32, and the EPS-ECU 33 from the OFF state to the ON state. At this time point, the engine ECU 31 starts the operation of an engine 41 described later.

On the other hand, an operation to the ignition switch 35 performed when the operation state of the drive assistance ECU 20 is the ON state is also referred to as an "ignition-OFF operation." When the ignition-OFF operation is performed, the drive assistance ECU 20 switches each of the operation states of the engine ECU 31, the brake ECU 32, and the EPS-ECU 33 from the ON state to the OFF state. At this time point, the engine ECU 31 stops the operation of the engine 41. Further, the operation state of the drive assistance ECU 20 becomes the OFF state.

Figure 4:
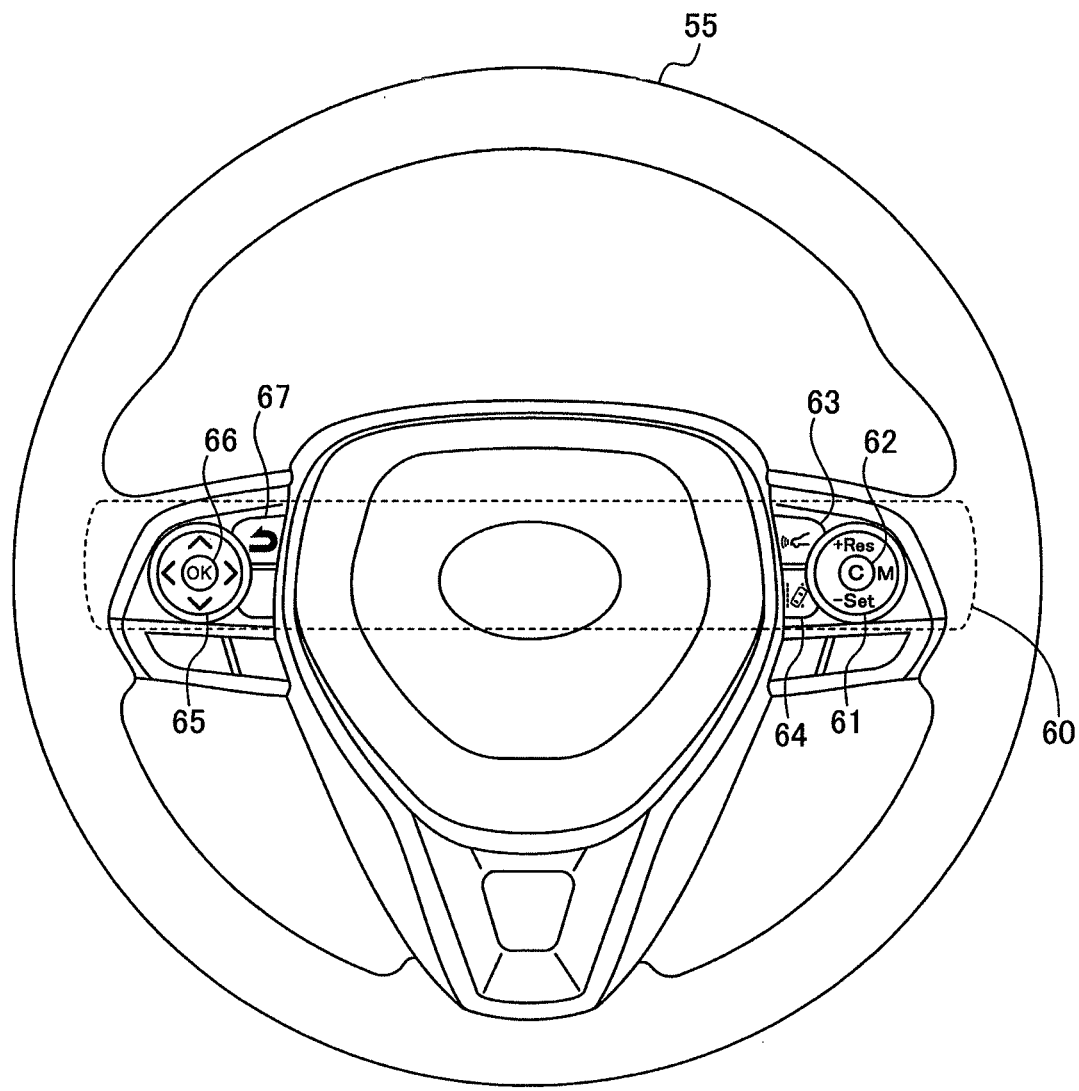
FIG. 4 is an illustration showing a steering wheel on which the operation section of the present assisting apparatus is arranged.

The operation switches 60 shown in FIG. 2 are arranged on a steering wheel 55 as illustrated in FIG. 4. The operation switches 60 include a cruise control switch 61, a cancel switch 62, a following distance (or target inter-vehicular distance) setting switch 63, an LTA switch 64, a selection switch 65, an OK switch 66, and a back switch 67. The cruise control switch 61 is also referred to as the CC switch 61 for simplification.

The drive assistance ECU 20 is connected to each of the operation switches 60 and configured to receive information regarding an operation by the driver to each of the operation switches 60. Specifically, when each of the operation switches 60 is pressed and when each of the operation switches 60 is released from pressing, the drive assistance ECU 20 can detect them. In other words, the drive assistance ECU 20 can detect pressing down of any one of the operation switches 60 when that one of the switches 60 is pressed down. The drive assistance ECU 20 can also detect releasing of any one of the operation switches 60 from the pressed state, when that one of the switches 60 is released. As described later, the driver of the vehicle 10 can change the setting sates of the driving assistance functions by operating the operation switches 60.

The CC switch 61 is so-called "cross key" and contains buttons (switches) of four directions (namely, an upper part (direction), a lower part, a right part, and a left part). A main switch is assigned to the right part of the CC switch 61. Namely, pressing the right part of the CC switch 61 is equivalent to pressing the main switch. Similarly, a resume switch is assigned to the upper part of the CC switch 61. A set switch is assigned to the lower part of the CC switch 61.

The selection switch 65 is so-called "cross key", similarly to the CC switch 61. A rightward switch is assigned to the right part of the selection switch 65. A leftward switch is assigned to the left part of the selection switch 65. An upward switch is assigned to the upper part of the selection switch 65. A downward switch is assigned to the lower part of the selection switch 65.

Control of Drive Force

The engine ECU 31 controls an engine 41 and a transmission 42 so as to adjust (control) a drive force of the vehicle 10 (see FIG. 2). The engine ECU 31 is connected to a plurality of engine sensors 43 and receives detection signals from these sensors. The engine sensors 43 detect operation state quantities (parameters) of the engine 41. The engine sensors 43 include an accelerator pedal operation amount (depression amount) sensor, a throttle valve opening sensor, an engine rotational speed sensor, an intake air amount sensor, and so on. The engine ECU 31 determines a required drive torque Dreq (a required value of a drive torque Dd described later) on the basis of the vehicle speed Vt and output values of the engine sensors 43.

In addition, the engine ECU 31 is connected to engine actuators 44 which include a throttle valve actuator, and a fuel injection valve, and controls the engine actuators 44 so as to control torque generated by the engine 41. The engine ECU 31 controls the engine actuators 44 and the transmission 42 such that the "drive torque Dd which is a torque transmitted to drive wheels of the vehicle 10" coincides with the required drive torque Dreq, to thereby control the acceleration As.

Further, when the engine ECU 31 receives a "drive force control request" including a target drive force Ddtg from the drive assistance ECU 20, the engine ECU 31 controls the engine actuators 44 and the transmission 42 such that the actual drive torque Dd coincides with the target drive force Ddtg.

Control of Brake Force

The brake ECU 32 controls a brake mechanism 45 which is formed by hydraulic friction brake apparatus installed on the vehicle 10. The brake ECU 32 is connected to a plurality of brake sensors 46 and receives detection signals from these sensors. The brake sensors 46 detect state quantities used for controlling the brake mechanism 45. The brake sensors 46 include an operation amount sensor for detecting the operation amount of a brake pedal, pressure sensors of brake oil applied to the brake mechanism 45, and so on. The brake ECU 32 determines a required brake force Breq (a required value of a brake force Bf described later) on the basis of the vehicle speed Vt and output values of the brake sensors 46.

In addition, the brake ECU 32 is connected to a plurality of brake actuators 47 which are hydraulic actuators of the brake mechanism 45. The brake ECU 32 controls the brake actuators 47 such that "the actual brake force Bf which is an actual frictional brake force applied to each of wheels" coincides with the required brake force Breq so as to control the acceleration As (in this case, negative acceleration; namely, deceleration).

Further, when the brake ECU 32 receives a "brake force control request" including a target brake force Bftg from the drive assistance ECU 20, the brake ECU 32 controls the brake actuators 47 such that the actual brake force Bf coincides with the target brake force Bftg.

Control of Steering Assist Torque and Steering Angle

The EPS-ECU 33 is connected to a torque sensor 51 and a steering angle sensor 52 and receives detection signals from these sensors. The torque sensor 51 detects a steering torque Ts which is a torque applied to the steering wheel 55 (see FIG. 4) by the driver, and outputs a signal indicative of the steering torque Ts to EPS-ECU 33. The steering angle sensor 52 detects a steering angle θs which is a rotation angle of the steering wheel 55, and outputs a signal indicative of the steering angle θs to the EPS-ECU 33.

The EPS-ECU 33 determines a target assist torque Tatg which is a target value of a torque for assisting driver's operation to the steering wheel 55 (namely, an assist torque), on the basis of the vehicle speed Vt, the steering torque Ts, the steering angle θs, and so on.

The EPS-ECU 33 is connected to a drive circuit 53. The drive circuit 53 supplies electrical power to a steering motor 54. The steering motor 54 generates a torque Tm which is a torque for rotating a steering shaft. The EPS-ECU 33 controls the drive circuit 53 such that the torque Tm coincides with target assist torque Tatg.

Further, when the EPS-ECU 33 receives a "steering angle control request" including a target steering angle θstg from the drive assistance ECU 20, the EPS-ECU 33 controls the steering motor 54 such that the actual steering angle θs coincides with the target steering angle Østg.

Overview of Driving Assistance Functions

The drive assistance ECU 20 provides various driving assistance functions so as to assist drive operation of the vehicle 10 by the driver. A table of the driving assistance functions provided by the drive assistance ECU 20 is shown in FIG. 5. An overview of the driving assistance functions will be described below.

(1) Pre-Crush Safety (PCS)

A pre-crush safety function is a function for generating an alert, generating the brake force Bf, and so on, in a case where the vehicle 10 is highly likely to collide with an obstacle (specifically, another vehicle, a bicycle, a pedestrian, and so on) while the vehicle 10 is moving forward. Alerts and notifications related to "the pre-crush safety function and the other of driving assistance functions" are provided through the display 27 and the speaker 28.

(2) Lane Tracing Assist (LTA)

A lane tracing assist function (hereinafter also referred to as "the LTA function" for simplification) includes a "lane deviation alerting function," a "lane deviation preventing function," and a "lane keeping assist function" which are described later. The lane deviation alerting function is a function for generating an alert when the vehicle 10 is about to deviate from "a lane in which the vehicle 10 is running (hereinafter also referred to as an "own lane")" while the vehicle 10 travels (runs) on an assisting target road (specifically, an expressway and a limited highway). The lane deviation preventing function is a function for controlling the steering angle θs such that the vehicle 10 does not deviate from the own lane while the vehicle 10 travels on the assisting target road. The lane keeping assist function is a function for controlling the steering angle θs such that the vehicle 10 travels along the own lane. The lane keeping assist function can be executed when a radar cruise control function described later is executed while the vehicle 10 travels on the assisting target road.

(3) Road Sign Assist (RSA)

A road sign assist function is a function for recognizing a roadway sign located ahead of the vehicle 10 and displaying a symbol representing the recognized roadway sign on the display 27. In addition, if a travel state of the vehicle 10 violates a traffic regulation represented by the recognized roadway sign while the road sign assist function is being executed, an alert is generated to the driver.

In an example of a screen (a top screen 71 described later) displayed on the display 27 shown in FIG. 6, a roadway sign 71a represents a speed limit sign recognized by the road sign assist function.

(4) Radar Cruise Control

The radar cruise control function (hereinafter also referred to as "the RCC function" for simplification) is a function for controlling the acceleration As such that a distance between the vehicle 10 and "an other preceding vehicle (hereinafter also referred to as a "following target vehicle") traveling ahead of the vehicle 10" coincides with a predetermined target inter-vehicular distance without driver's operation to the accelerator pedal. When the following target vehicle is not present, the acceleration As is controlled such that vehicle speed Vt coincides with a set speed Vset which is set by a setting procedure described later. The radar cruise control function is also referred to as an "adaptive cruise control (ACC) function."

A setting item related to the radar cruise control function is the "target inter-vehicular distance." The driver can set the target inter-vehicular distance to any one of "long (namely, relatively long distance)," "middle (namely, intermediate distance)" and "short (namely, relatively short distance)."

Figure 6:
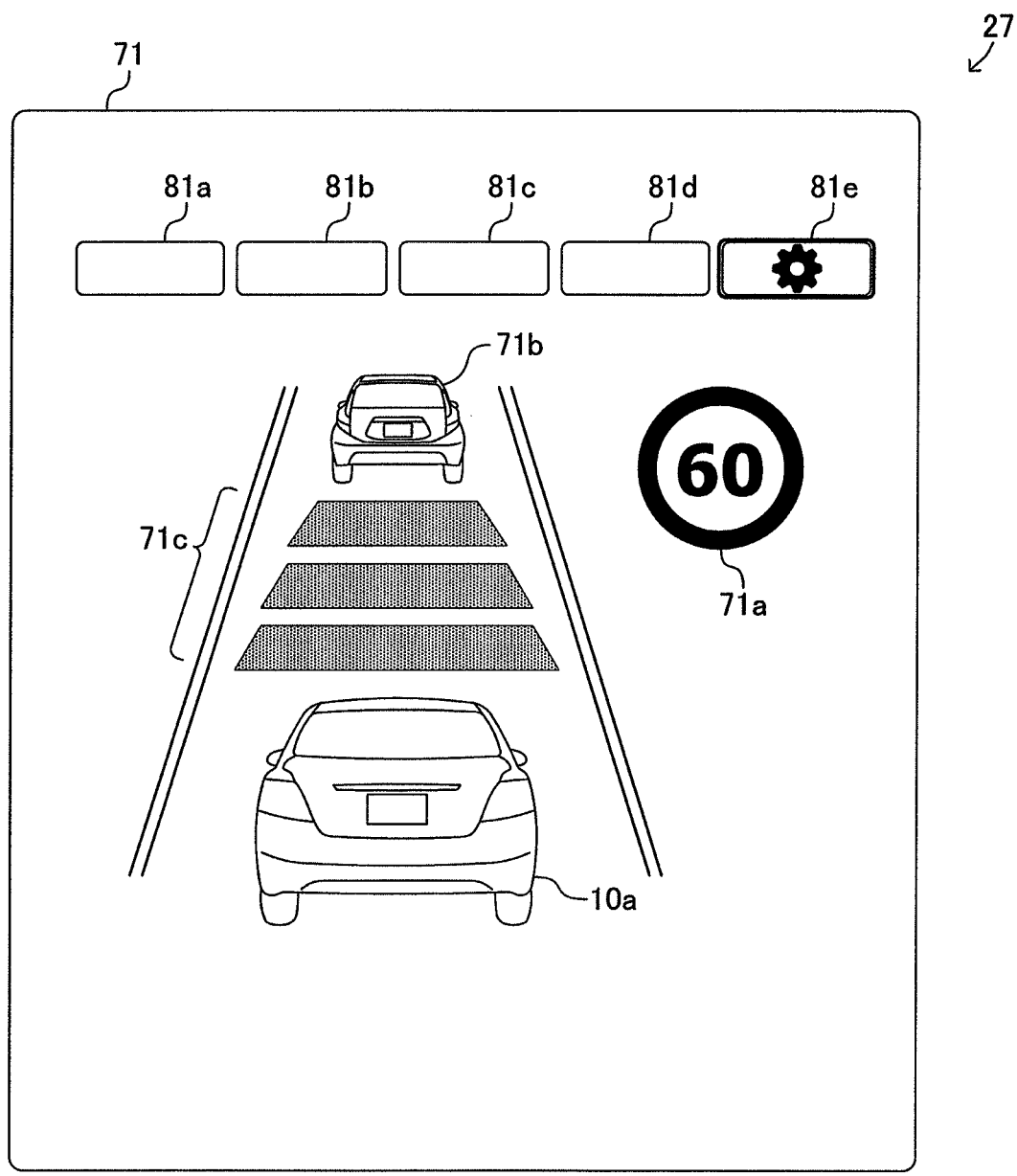
FIG. 6 is an illustration of a top screen which the present assisting apparatus displays on the display section.

In the top screen 71 shown in FIG. 6, a vehicle symbol 10a represents the vehicle 10 and a vehicle symbol 71b represents the following target vehicle. In addition, a following distance symbol 71c represents that the target inter-vehicular distance has been set at the "long."

(5) Preceding Vehicle Start Notification

A preceding vehicle start notification function is a function for notifying the driver of a preceding vehicle's starting when a distance between the vehicle 10 which continues stopping and the preceding vehicle which has started running (moving) becomes equal to or greater than a "notification distance," after the vehicle 10 stopped behind the preceding vehicle.

A setting item related to the preceding vehicle start notification function is the "notification distance." The driver can set the notification distance to any one of the "long," the "middle" and the "short."

(6) Blind Spot Monitoring (BSM)

A blind spot monitoring function is a function for notifying the driver of presence of an obstacle on the rear side of the vehicle 10 if the obstacle is present while the vehicle 10 is changing lanes.

(7) Clearance Sonar

A clearance sonar function is a function for notifying the driver of an obstacle (especially, a stationary object; for example, a wall) in the vicinity of the vehicle 10 if such an obstacle is present.

(8) Rear Cross Traffic Alarm (RCTA)

A rear cross traffic alarm function is a function for notifying the driver of an obstacle (especially, another vehicle) approaching the vehicle 10 on the rear side of the vehicle 10 if such an obstacle is present while the vehicle 10 is moving back.

(9) Parking Support Brake (PKSB)

A parking support brake function is a function for generating an alert, generating the brake force Bf, and so on in a case where the vehicle 10 is highly likely to collide with an obstacle (especially, a wall, or another vehicle) while the vehicle 10 is moving at low speeds.

In order to provide these driving assistance functions, the drive assistance ECU 20 utilizes the front image received from the front camera 21 and the target information received from the millimeter wave radars 22. In addition, in order to provide the driving assistance functions, the drive assistance ECU 20 controls the engine ECU 31, the brake ECU 32, and the EPS-ECU 33, as needed basis. Namely, the drive assistance ECU 20 transmits the drive force control request, the brake force control request, and/or the steering angle control request to one or more of the ECUs corresponding to each request as necessary.

For example, while executing the RCC function, the drive assistance ECU 20 obtains (determines) a target acceleration Astg every time a predetermined time elapses. In order to obtain (determine) the target acceleration Astg, the drive assistance ECU 20 obtains and utilize a distance and a relative speed between the vehicle 10 and the following target vehicle on the basis of the target information. When the following target vehicle is not present, the drive assistance ECU 20 obtains (figures out) the target acceleration Astg such that vehicle speed Vt coincides with the set speed Vset. In addition, the drive assistance ECU 20 controls the engine ECU 31 and the brake ECU 32 such that the actual acceleration As coincides with the target acceleration Astg.

Furthermore, while the LTA function is being executed (more specifically, while the lane keeping assist function is being executed), the drive assistance ECU 20 obtains (determines) the target steering angle θstg every time a predetermined time elapses and transmits the steering angle control request including that target steering angle θstg to the EPS-ECU 33. In order to obtain the target steering angle θstg, the drive assistance ECU 20 extracts (recognizes) a pair of lane segmentations (markers) (namely, lane segmentation lines) which defines the own lane (namely, a left side lane segmentation line and a right side lane segmentation line) included in the front image by a well-known method.

In addition, the drive assistance ECU 20 obtains (determines), as a lane center line, a set of center points in the horizontal (lateral) direction between the left side lane segmentation line and the right side lane segmentation line, each of the lane segmentation lines extending ahead of the vehicle 10, based on a position of the vehicle 10 relative to those lane segmentation lines. Further, the drive assistance ECU 20 obtains (determines) the difference (deviation) between the lane center line and the actual traveling route of the vehicle 10, and obtains the target steering angle θstg on the basis of the difference such that the vehicle 10 travels on/along the lane center line.

Changing Procedure of Setting States Related to Driving Assistance Functions

The drive assistance ECU 20 is configured to allow the driver of the vehicle 10 to change the setting states (setting values, parameters) related to the driving assistance functions by operation (manipulation) to the operation switches 60. The drive assistance ECU 20 provides the above-described driving assistance functions based on the changed setting states. Changing procedures of the driving assistance functions (specifically, the RCC function, the LTA function, and the other functions) will be described.

When the driver presses the main switch of the CC switch 61 while the request state of the RCC function is the OFF state, and thereafter the driver presses the set switch within a predetermined time from a time point at which the driver presses the main switch of the CC switch 61, the drive assistance ECU 20 switches the request state of the RCC function to the ON state. In addition, the drive assistance ECU 20 sets the set speed Vset to a value which is equal to the vehicle speed Vt at the present time at which the driver has pressed the main switch of the CC switch 61.

When the resume switch of the CC switch 61 is pressed while the request state of the RCC function is the ON state (namely, while the RCC function is executed), the drive assistance ECU 20 increases the set speed Vset by a predetermined amount. Meanwhile, when the set switch of the CC switch 61 is pressed while the RCC function is executed, the drive assistance ECU 20 decreases the set speed Vset by a predetermined amount. When the cancel switch 62 is pressed or when an operation to the brake pedal is performed, while the RCC function is executed, the drive assistance ECU 20 switches the request state of the RCC function to the OFF state.

Hereinafter, an operation to switch the request state of a certain driving assistance function from the OFF state to the ON state will also be referred to as an "ON operation" for simplification. Thus, for instance, the ON operation of the RCC function is an operation of pressing the set switch of the CC switch 61 within the predetermined time after the main switch of the CC switch 61 is pressed. Meanwhile, an operation to switch the request state of a certain driving assistance function from the ON state to the OFF state will also be referred to as an "OFF operation" for simplification. Thus, for instance, the OFF operation of the RCC function is an operation of pressing the cancel switch 62 and an operation to the brake pedal. The ON operation and the OFF operation are also collectively referred to as "request state changing operation" for convenience' sake.

The following distance setting switch 63 is utilized for switching the target inter-vehicular distance of the RCC function. Specifically, the drive assistance ECU 20 switches the target inter-vehicular distance in the order of the "long", the "middle", the "short", and the "long" . . . each time the following distance setting switch 63 is pressed.

The LTA switch 64 is utilized for switching the request state of the LTA function. The drive assistance ECU 20 switches the request state of the LTA function between the ON state and the OFF state each time the LTA switch 64 is pressed.

In order for the driver to change the setting state related to the driving assistance functions other than the RCC function and the LTA function, the driver performs an operation to the selection switch 65 and the OK switch 66 while referring to screens displayed on the display 27. Specifically, the driver uses the selection switch 65 (specifically, the rightward switch, the leftward switch, the upward switch and the downward switch of the selection switch 65) so as to tentatively choose (single out) a desired button from among "button elements" displayed on the display 27. The tentatively chosen button is highlighted. Every time the selection switch 65 is operated (pressed), the highlighted button changes from one of the displayed button elements to another one in response to the pressed switch. Then, the driver presses the OK switch 66 to select (or finally determine as the selected button) the desired button which is being highlighted when the OK switch 66 is pressed. The selected button continues being highlighted.

For example, the top screen 71 is displayed on the display 27, if the driver has not performed any operation to the operation switches 60 since the ignition-ON operation was performed and the drive assistance ECU 20 begun operation. An example of the top screen 71 in a case where the road sign assist function and the RCC function are executed is shown in FIG. 6. A menu button 81a to a menu button 81e are contained in the top screen 71.

Figure 7:
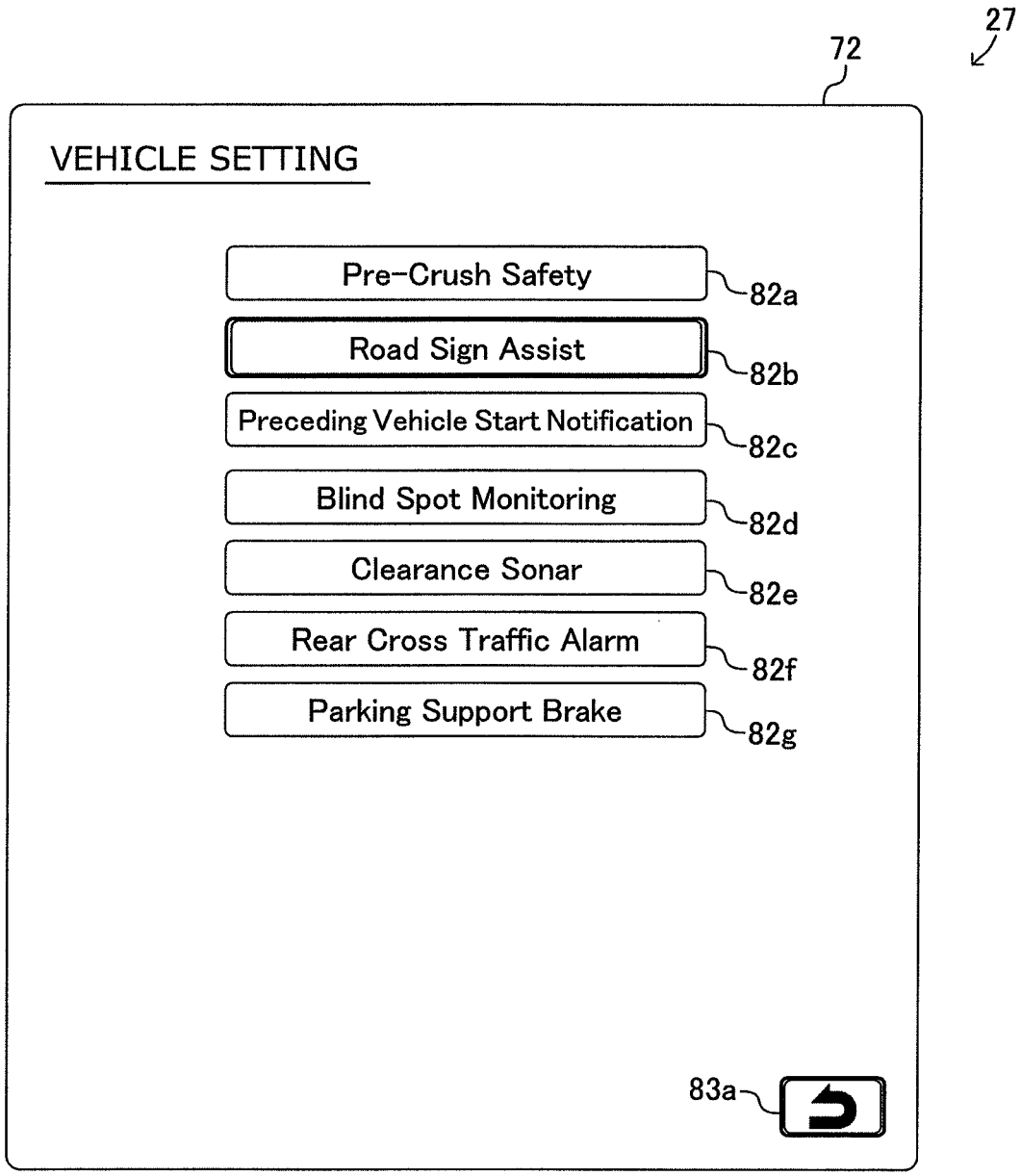
FIG. 7 is an illustration of a vehicle setting screen which the present assisting apparatus displays on the display section.

In the screen shown in FIG. 6 and other examples of screens shown in FIG. 7 to FIG. 18 described later, highlighted buttons are indicated with thick lines (heavy lines) surrounding the buttons. In the example shown in FIG. 6, the menu button 81e is highlighted. When the menu button 81e is selected by means of the selection switch 65 and the OK switch 66 (i.e., the menu button 81e is determine to be the selected button) by the driver, a vehicle setting screen 72 shown in FIG. 7 is displayed on the display 27.

The vehicle setting screen 72 contains a function button 82a to a function button 82g and a back (return) button 83a. The function button 82a to the function button 82g are associated with the drive assistance functions other than the RCC function and the LTA function. When the back button 83a is selected, the screen displayed on the display 27 switches back to the top screen 71. Similarly, when the back switch 67 shown in FIG. 4 is pressed while the vehicle setting screen 72 is displayed on the display 27, the screen displayed on the display 27 switches back to the top screen 71.

Notably, when the back switch 67 is pressed while a screen containing each of back buttons 83b to 83h described later is displayed on the display 27, the drive assistance ECU 20 executes the same processing as the processing of screen transition which is executed when the back button (namely, any one of the back buttons 83b to 83h) displayed on the display 27 is selected.

Figure 8:
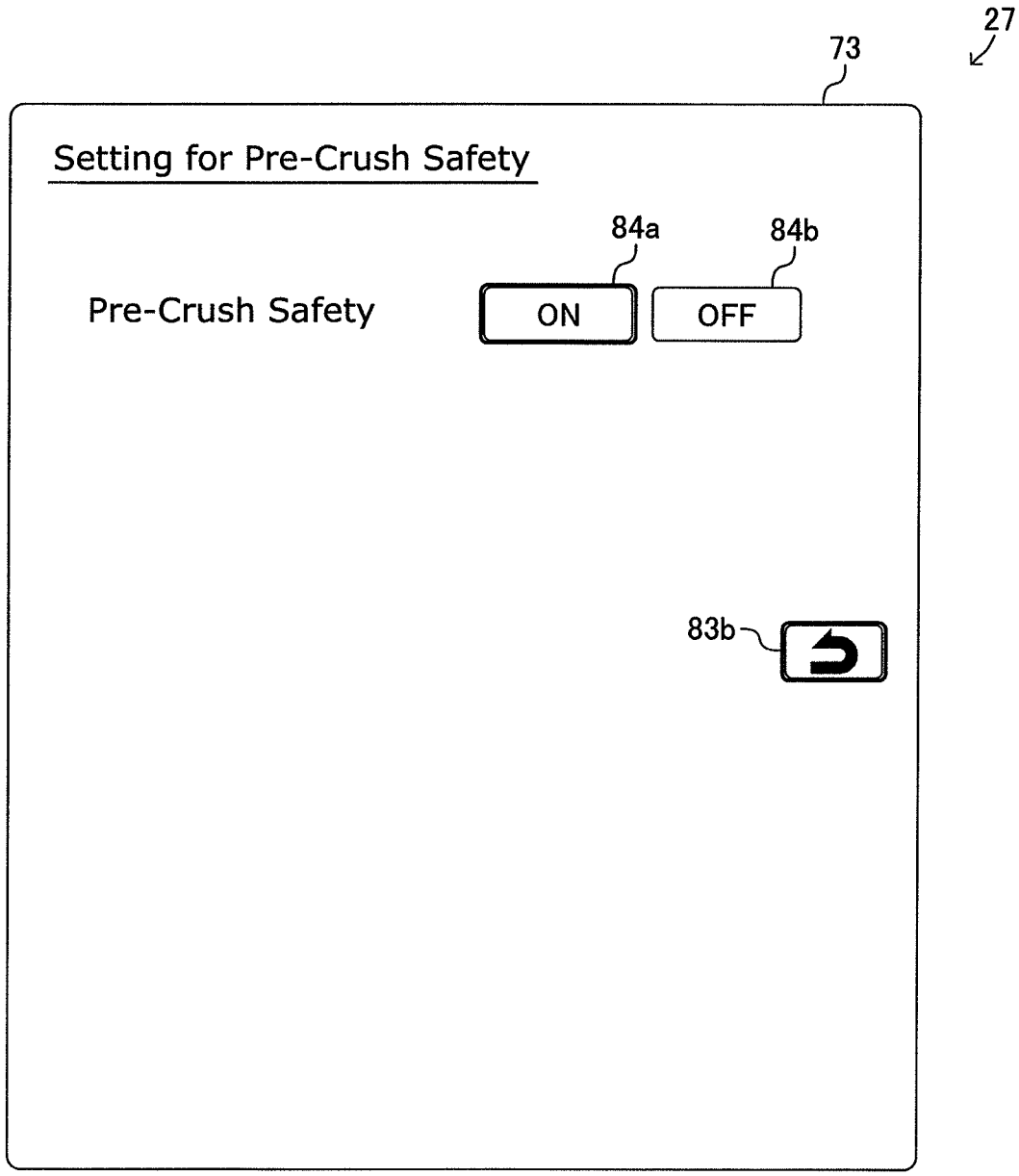
FIG. 8 is an illustration of a setting screen of a pre-crush safety function which the present assisting apparatus displays on the display section.

Description of setting changing procedure related to the driving assistance functions is resumed. For example, when the function button 82a of the vehicle setting screen 72 is selected, a setting screen 73 related to the pre-crush safety function shown in FIG. 8 is displayed on the display 27. The setting screen 73 contains an ON button 84a, an OFF button 84b, and the back button 83b. When the back button 83b is selected, the screen displayed on the display 27 switches back to the vehicle setting screen 72.

If the request state of the pre-crush safety function is the ON state at the time when the setting screen 73 starts to be displayed on the display 27, the ON button 84a is highlighted as shown in the example of FIG. 8. Meanwhile, if the request state of the pre-crush safety function is the OFF state at the time when the setting screen 73 starts to be displayed on the display 27, the OFF button 84b is highlighted.

The driver can switch (change) the request state of the pre-crush safety function between the ON state and the OFF state by an operation of selecting either the ON button 84a or the OFF button 84b (namely, by an operation of changing (switching over) the highlighted button from one of the ON button 84a and the OFF button 84b to the other one using the selection switch 65, and then pressing the OK switch 66).

Figure 9:
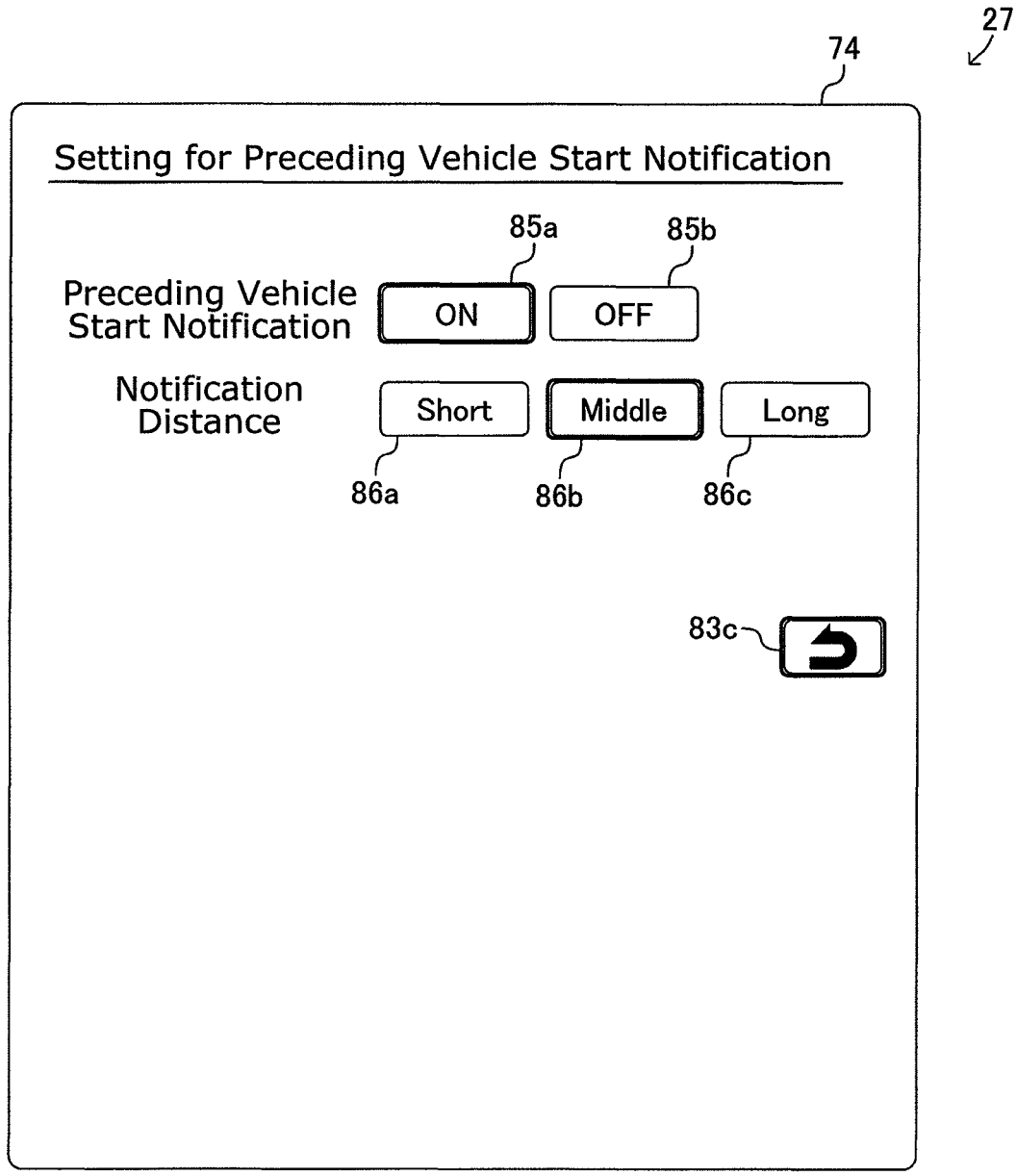
FIG. 9 is an illustration of a setting screen of a preceding vehicle start notification function which the present assisting apparatus displays on the display section.

Meanwhile, when the function button 82c of the vehicle setting screen 72 shown in FIG. 7 is selected, a setting screen 74 related to the preceding vehicle start notification function shown in FIG. 9 is displayed on the display 27. The setting screen 74 contains an ON button 85a, an OFF button 85b, distance buttons 86a to 86c, and the back button 83c. The ON button 85a and the OFF button 85b are associated with the request state of the preceding vehicle start notification function. Each of the distance buttons 86a to 86c is associated with the notification distance which is the setting item related to the preceding vehicle start notification function. When the back button 83c is selected, the screen displayed on the display 27 switches back to the vehicle setting screen 72.

As understood from FIGS. 8 and 9, a setting screen related to a driving assistance function which has a setting item (referred to as "additional setting item") other than the request state contains buttons which are associated with the other setting item. As understood from FIG. 9, the driver is allowed to change the notification distance (serving as the additional setting item) by selecting any one button from the distance buttons 86a, 86b, and 86c.

Setting Change Confirmation Processing

When a predetermined condition (which is also referred to as a "specific condition" for convenience' sake.) is satisfied, the drive assistance ECU 20 executes a "setting change confirmation processing" to confirm with the driver whether or not the request state of the driving assistance function associated with the specific condition is to be changed between the OFF state and the ON state. The driving assistance function associated with the specific condition is also referred to as a "confirmation target function" for convenience' sake.

In the setting change confirmation processing, the drive assistance ECU 20 displays a changing confirmation screen described later (for example, a changing confirmation screen 75a shown in FIG. 10) on the display 27 in order to confirm whether or not the request state of the driving assistance function (namely, the confirmation target function) associated with that setting change confirmation processing is to be changed. Information distributed (given) to the driver by (through) the changing confirmation screen is also referred to as "confirmation information" for convenience' sake.

Figure 10:
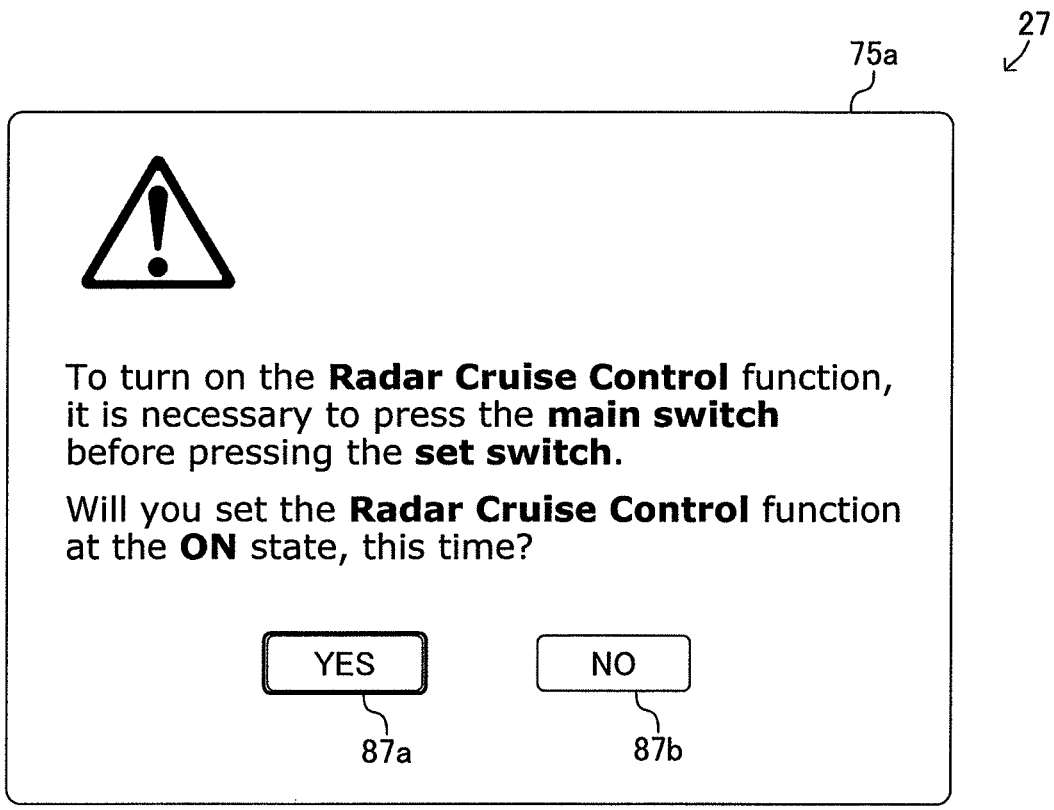
FIG. 10 is an illustration of a changing confirmation screen related to a RCC starting confirmation processing which the present assisting apparatus executes.

Each of the changing confirmation screens contains an approval button (for example, an approval button 87a shown in FIG. 10). When the driver selects the approval button in response to the confirmation information, the drive assistance ECU 20 changes the request state of the confirmation target function associated with the confirmation information. An operation of selecting the approval button is also referred to as an "approving operation" for convenience' sake.

In the present embodiment, the setting change confirmation processing includes (is classified into) a "RCC starting confirmation processing," an "operation stopping confirmation processing," a "prerequisite function starting processing" and "operation starting suggestion processing." Each setting change confirmation processing will next be described.

Setting Change Confirmation Processing—RCC Starting Confirmation Processing

When the set switch of the CC switch 61 is pressed (while the main switch of the CC switch 61 is not pressed) in a case where the request state of the RCC function has been the OFF state, the drive assistance ECU 20 executes the RCC starting confirmation processing in order to confirm with the driver whether or not the request state of the RCC function is to be switched to the ON state from the OFF state. Namely, as for the RCC starting confirmation processing, the RCC function is a confirmation target function. The operation of pressing the set switch of the CC switch 61 without the operation of pressing the main switch of the CC switch 61 in the case where the request state of the RCC function has been the OFF state is also referred to as the "similar operation" for convenience' sake.

At the start of the RCC starting confirmation processing, the drive assistance ECU 20 displays the changing confirmation screen 75a, which is related to the RCC starting confirmation processing, shown in FIG. 10 on the display 27. The changing confirmation screen 75a contains the approval button 87a and a denial (rejection) button 87b. In addition, the changing confirmation screen 75a contains descriptions (messages) (namely, the confirmation information) which describe the ON operation of the RCC function and notify the driver that selecting the approval button 87a will cause the RCC function to change into the ON state. Specifically, the descriptions (messages) tell the driver (1) how to perform the ON operation of the RCC function (namely, a message that pressing the set switch of the CC switch 61 within the predetermined time after the main switch of the CC switch 61 is pressed is the ON operation of the RCC function), and (2) that the request state of the RCC function will be switched to the ON state if the approval button 87a currently shown on the changing confirmation screen 75a is selected.

When the driver selects the approval button 87a, the drive assistance ECU 20 switches the request state of the RCC function to the ON state, and sets the set speed Vset to a value which is equal to the vehicle speed Vt at the present time. In addition, in this case, the drive assistance ECU 20 displays a changing notification screen 75b related to the RCC starting confirmation processing shown in FIG. 11 on the display 27 so as to notify the driver that the request state of the RCC function has been switched from the OFF state to the ON state.

The changing notification screen 75b contains the back button 83d. When the driver selects the back button 83d, or when a state in which the back button 83d is not selected continues for a predetermined display time Td since/after the changing notification screen 75b was started to be displayed, the drive assistance ECU 20 starts to display a screen which was displayed just/immediately before the changing confirmation screen 75a is displayed. Hereinafter, the screen which was displayed immediately before the setting change confirmation processing is started to be displayed is also referred to as the "previous screen."

Meanwhile, if the driver selects the denial button 87b while the changing confirmation screen 75a is being displayed, the drive assistance ECU 20 keeps the request state of the RCC function in the OFF state. Furthermore, when a state in which the neither the approval button 87a nor the denial button 87b is selected continues for the display time Td after/since the changing confirmation screen 75a was started to be displayed, the drive assistance ECU 20 also keeps the request state of the RCC function in the OFF state. In addition, in these cases, the drive assistance ECU 20 displays the previous screen on the display 27. When the drive assistance ECU 20 starts to display the previous screen on the display 27, the drive assistance ECU 20 ends the execution of the RCC starting confirmation processing.

Incidentally, a period from a point in time of the ignition-ON operation to a point in time of the ignition-OFF operation is also referred to as a "trip." The drive assistance ECU 20 does not execute the RCC starting confirmation processing multiple times during a (one) trip. Namely, in a period from a point in time when the RCC starting confirmation processing is ended to a point in time of the ignition-OFF operation, the drive assistance ECU 20 does not execute the RCC starting confirmation processing again, even if the set switch of the CC switch 61 is pressed (while the main switch of the CC switch 61 is not pressed) in a state in which the request state of the RCC function has been the OFF state. In other words, the RCC starting confirmation processing is executed only once at most during the one trip.

Setting Change Confirmation Processing—Operation Stopping Confirmation Processing When the driver performs the OFF operation related to one of predetermined driving assistance functions among the driving assistance functions described above, the drive assistance ECU 20 executes the operation stopping confirmation processing to confirm with the driver whether or not this OFF operation is performed intentionally. Specifically, the drive assistance ECU 20 executes the operation stopping confirmation processing when the OFF operation of any one of the driving assistance functions (referred to as "operation stopping confirmation target functions") which are marked with a white circle in a column Cm1 of a table shown in FIG. 5. Each of the operation stopping confirmation target functions is the confirmation target function related to the operation stopping confirmation processing. Each of the operation stopping confirmation target functions is a function whose request state is preferably (or should be) maintained in the ON state as far as there is no particular reason.

Now, the OFF operation of the pre-crush safety function which is one of the operation stopping confirmation target functions will next be described in order to (exemplarily) describe the operation stopping confirmation processing. When the OFF button 84b of the setting screen 73 (see FIG. 8) is selected while the request state of the pre-crush safety function has been the ON state (namely, when the OFF operation of the pre-crush safety function is performed), the drive assistance ECU 20 starts the operation stopping confirmation processing.

Figure 12:
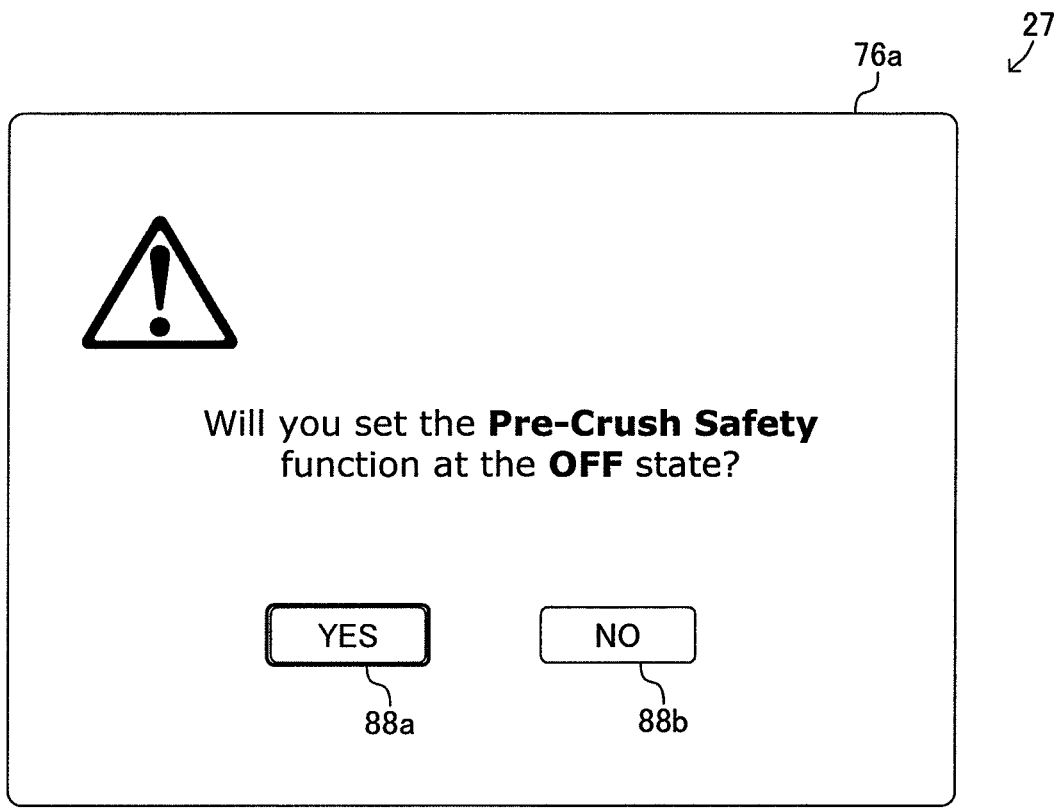
FIG. 12 is an illustration of a changing confirmation screen related to an operation stopping confirmation processing which the present assisting apparatus executes.
Figure 13:
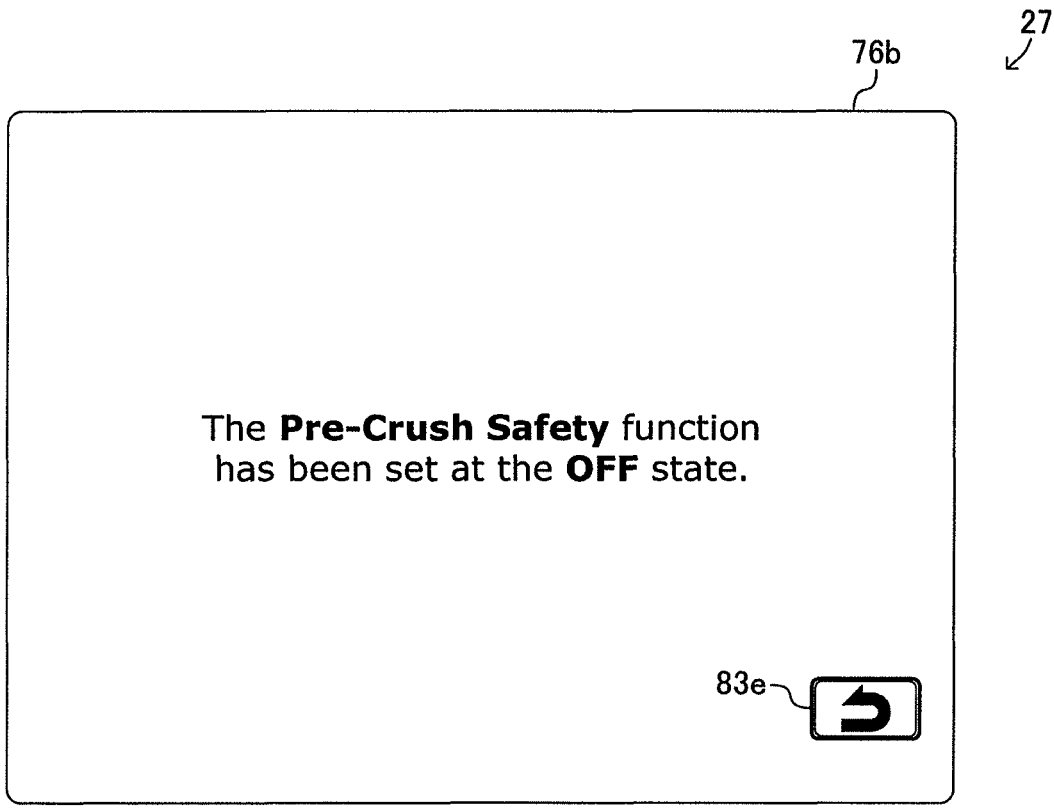
FIG. 13 is an illustration of a changing notification screen related to the operation stopping confirmation processing.

The drive assistance ECU 20 displays "a changing confirmation screen 76a related to the operation stopping confirmation processing" exemplarily shown in FIG. 12 on the display 27 at the start of the operation stopping confirmation processing. The changing confirmation screen 76a contains an approval button 88a and a denial (rejection) button 88b.

When the driver selects the approval button 88a, the drive assistance ECU 20 switches the request state of the pre-crush safety function from the ON state to the OFF state. In addition, in this case, the drive assistance ECU 20 displays "a changing notification screen 76b related to the operation stopping confirmation processing" exemplarily shown in FIG. 13 on the display 27 so as to notify the driver that the request state of the pre-crush safety function has been switched to the OFF state.

The changing notification screen 76b contains the back button 83e. When the driver selects the back button 83e, or when a state in which the back button 83e is not selected continues for the display time Td after/since the changing notification screen 76b was started to be displayed, the drive assistance ECU 20 starts to display the previous screen on the display 27.

Meanwhile, if the driver selects the denial button 88b while the changing confirmation screen 76a is being displayed, the drive assistance ECU 20 keeps the request state of the pre-crush safety function in the ON state. Furthermore, when a state in which the neither the approval button 88a nor the denial button 88b is selected continues for the display time Td after/since the changing confirmation screen 76a was started to be displayed, the drive assistance ECU 20 also keeps the request state of the pre-crush safety function in the ON state. In addition, in these cases, the drive assistance ECU 20 starts to display the previous screen on the display 27.

Setting Change Confirmation Processing—Prerequisite Function Starting Processing As described above, the lane keeping assist function included in the LTA function is not executed unless the RCC function is being executed. In other words, the RCC function is prerequisite (a prerequisite function) for executing the lane keeping assist function. In view of this, when the driver performs the ON operation of the LTA function while the request state of the RCC function is the OFF state, the drive assistance ECU 20 executes the prerequisite function starting processing to confirm with the driver whether or not the request state of the RCC function as well as the request state of the LTA function is to be switched to the ON state. Namely, when the LTA switch 64 is pressed while the request states of both the LTA function and the RCC function are the OFF state, the brake ECU 20 starts the prerequisite function starting processing related to the LTA function (more specifically, the lane keeping assist function). The RCC function is the confirmation target function related to the prerequisite function starting processing.

Figure 14:
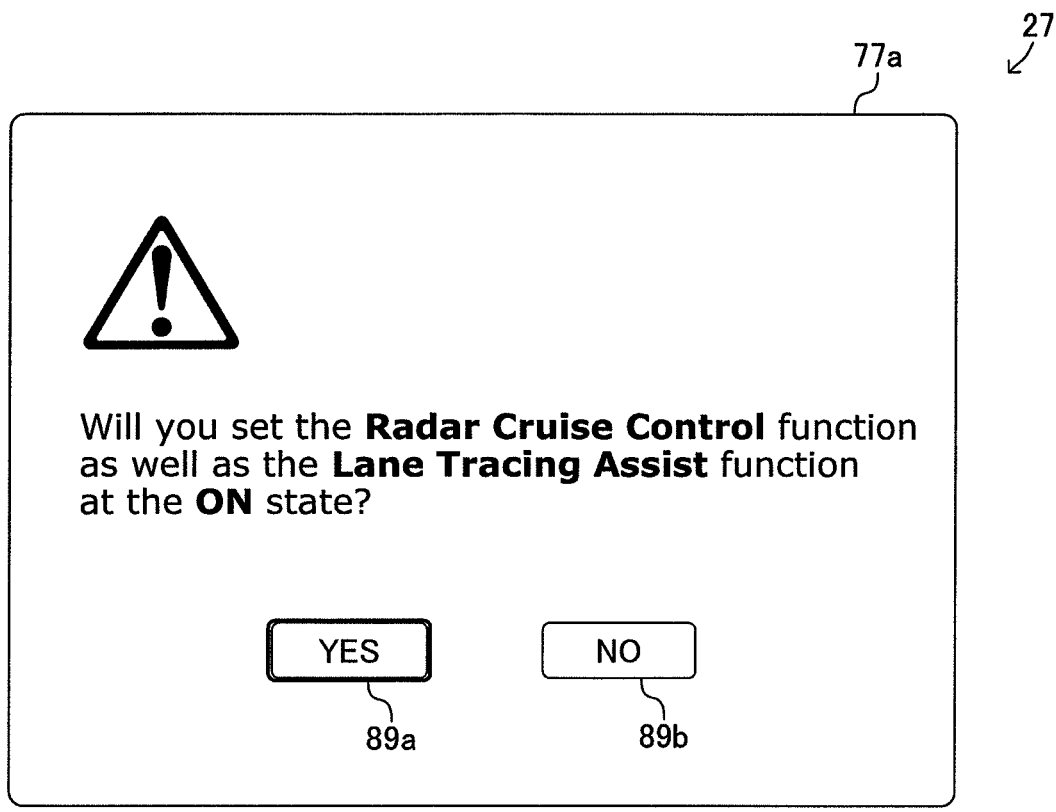
FIG. 14 is an illustration of a changing confirmation screen related to a prerequisite function starting processing which the present assisting apparatus executes.
Figure 15:
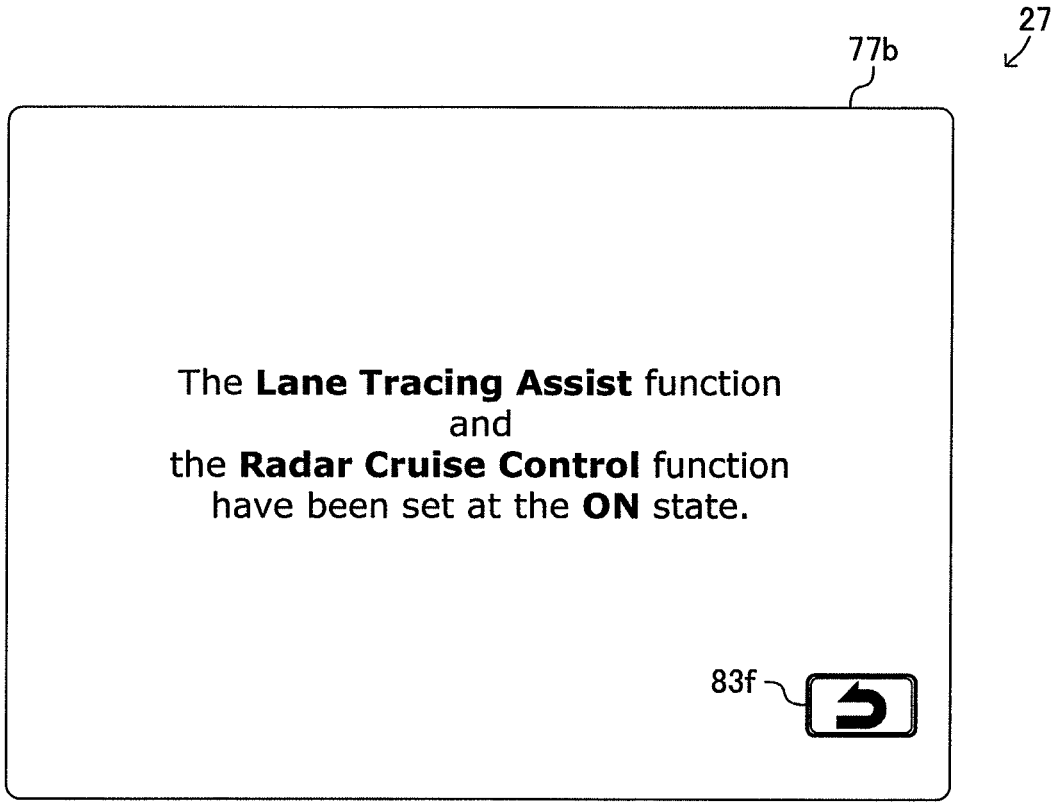
FIG. 15 is an illustration of a first changing notification screen related to the prerequisite function starting processing.
Figure 16:
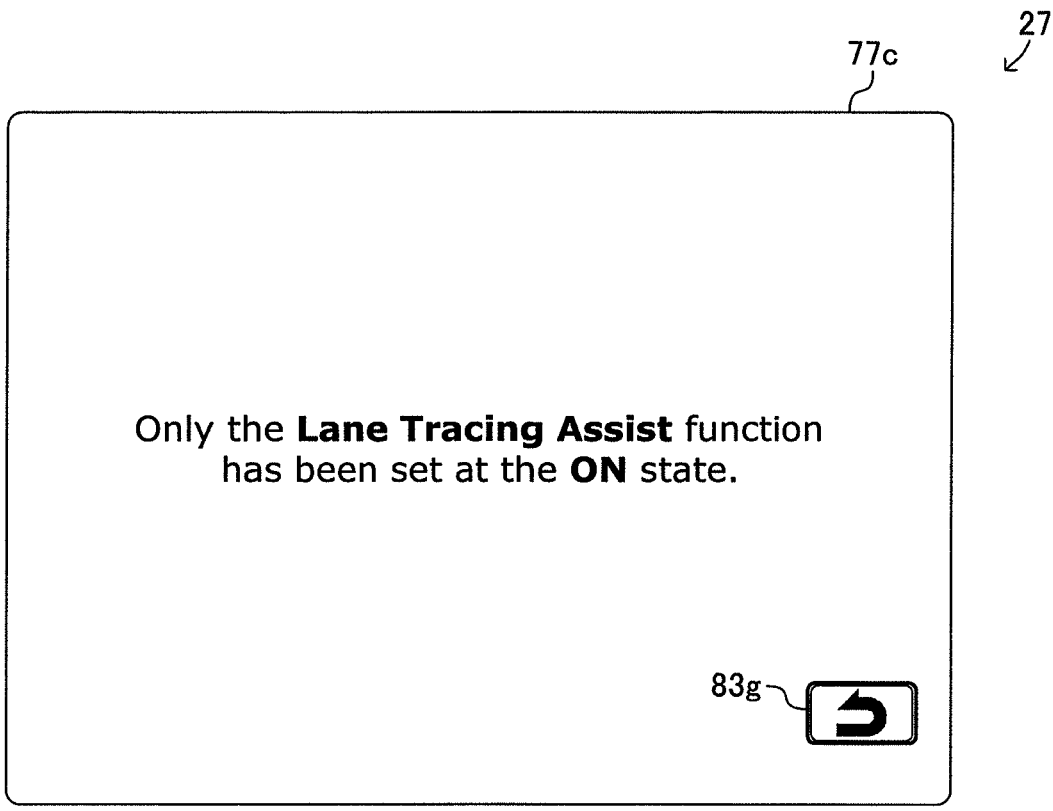
FIG. 16 is an illustration of a second changing notification screen related to the prerequisite function starting processing.

The drive assistance ECU 20 displays "a changing confirmation screen 77a related to the prerequisite function starting processing" shown in FIG. 14 on the display 27, at the start time of the prerequisite function starting processing. The changing confirmation screen 77a contains an approval button 89a and a denial button 89b.

When the driver selects the approval button 89a, the drive assistance ECU 20 switches each of the request states of the LTA function and the RCC function from the OFF state to the ON state, and sets the set speed Vset to a value which is equal to the vehicle speed Vt at the present time. In addition, in this case, the drive assistance ECU 20 displays "a first changing notification screen 77b related to the prerequisite function starting processing" shown in FIG. 15 on the display 27 so as to notify the driver that the request states of the LTA function and the RCC function have been switched to the ON state.

The first changing notification screen 77b contains the back button 83f. When the driver selects the back button 83f, or when a state in which the back button 83f is not selected continues for the display time Td after/since the first changing notification screen 77b was started to be displayed, the drive assistance ECU 20 starts to display the previous screen on the display 27.

Meanwhile, if the driver selects the denial button 89b while the changing confirmation screen 77a is being displayed, the drive assistance ECU 20 switches the request state of the LTA function from the OFF state to the ON state, but keeps the request state of the RCC function in the OFF state. Furthermore, when a state in which the neither the approval button 89a nor the denial button 89b is selected continues for the display time Td after/since the changing confirmation screen 77a was started to be displayed, the drive assistance ECU 20 switches the request state of the LTA function from the OFF state to the ON state, but keeps the request state of the RCC function in the OFF state. In addition, in these cases, the drive assistance ECU 20 starts to display "a second changing notification screen 77c related to the prerequisite function starting processing" shown in FIG. 16 to notify the driver that only the request state of the LTA function has been switched to the ON state.

The second changing notification screen 77c contains the back button 83g. When the driver selects the back button 83g, or when a state in which the back button 83g is not selected continues for the display time Td since/after the second changing notification screen 77c was started to be displayed, the drive assistance ECU 20 starts to display the previous screen on the display 27.

Setting Change Confirmation
Processing—Operation Starting Suggestion
Processing

The driving assistance functions which are marked with a white circle in a column Cm2 of the table shown in FIG. 5 (namely, the LTA function, the RCC function, and the blind spot monitoring function) are particularly useful especially when the vehicle 10 is traveling on the expressway or the limited highway. A state where the vehicle 10 is traveling on one of these ways is also referred to as a "specific traveling state" for convenience' sake. However, while the traveling state of the vehicle 10 is the specific traveling state, there may be a case where the request state(s) of a part of or all of these driving assistance functions (namely, the functions which are marked with the white circle in the column Cm2, and hereinafter are also referred to as "traveling state related functions.") is (are) the OFF state. Hereinafter, a driving assistance function whose request state is the OFF state among the traveling state related functions is also referred to as a "suggestion target function."

When the present position Pn is on the "link" which represents either the expressway or the limited highway in the map database 26, the drive assistance ECU 20 determines that the traveling state of the vehicle 10 is the specific traveling state. If the suggestion target function is present when the traveling state of the vehicle 10 is the specific traveling state, the drive assistance ECU 20 executes the "operation starting suggestion processing" to suggest to the driver to switch the request state of the suggestion target function to the ON state. The suggestion target function is the confirmation target function related to the operation starting suggestion processing.

Figure 17:
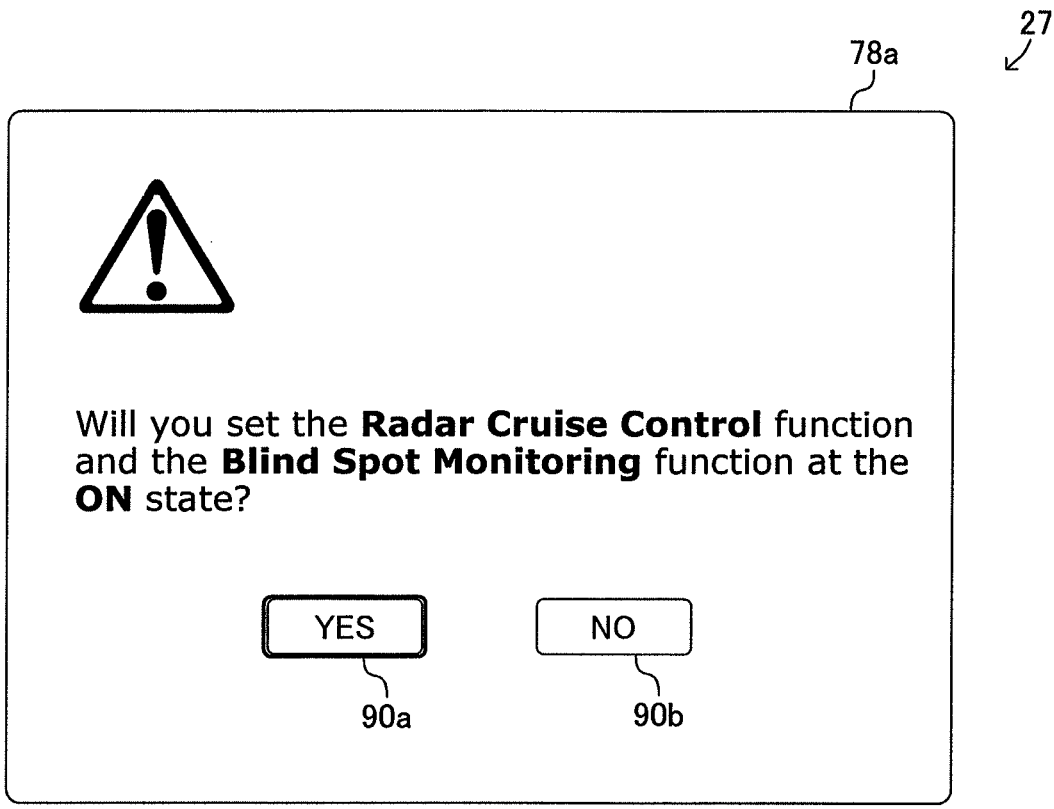
FIG. 17 is an illustration of a changing confirmation screen related to an operation starting suggestion processing which the present assisting apparatus executes.
Figure 18:
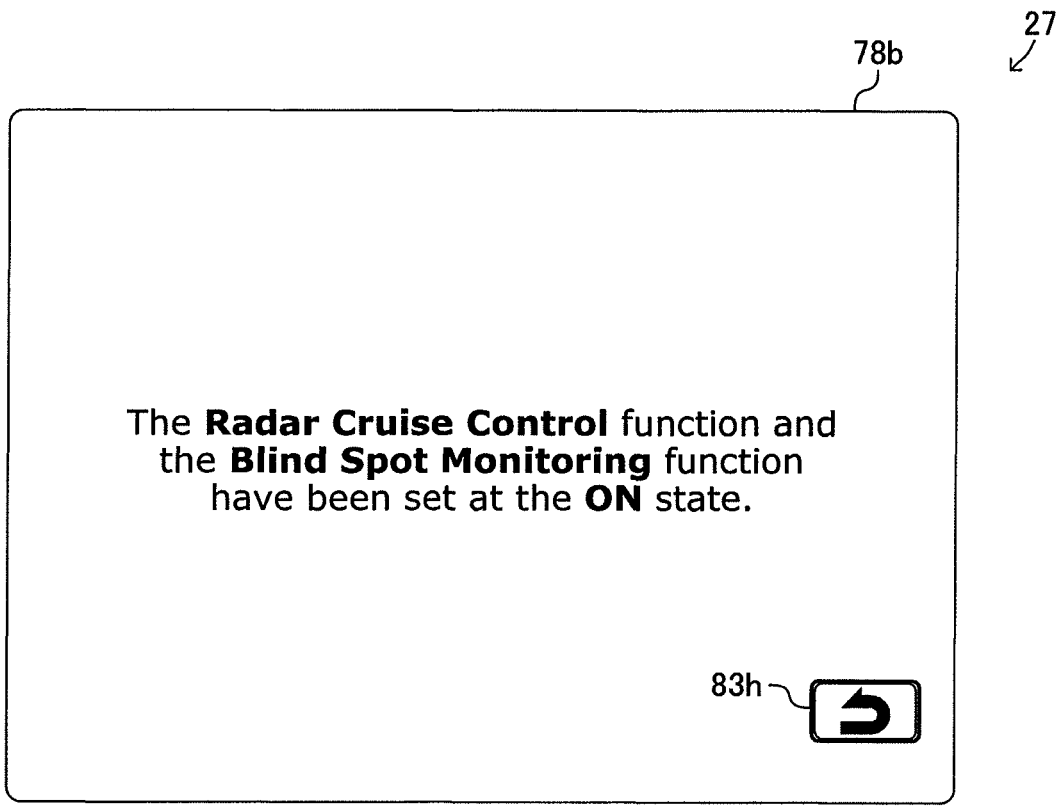
FIG. 18 is an illustration of a changing notification screen related to the operation starting suggestion processing.

The drive assistance ECU 20 displays "a changing confirmation screen 78a related to the operation starting suggestion processing" exemplarily shown in FIG. 17 on the display 27, at the start time of the operation starting suggestion processing. In the present example, the request state of the LTA function is the ON state and the request states of both the RCC function and the blind spot monitoring function are the OFF state, and thus, the RCC function and the blind spot monitoring function are suggestion target functions. Accordingly, in this case, the drive assistance ECU 20 displays the changing confirmation screen 78a so as to suggest to the driver to switch the request states of the suggestion target functions (namely, the RCC function and the blind spot monitoring function) to the ON state.

The changing confirmation screen 78a contains an approval button 90a and a denial button 90b. When the driver selects the approval button 90a, the drive assistance ECU 20 switches each of the request states of the suggestion target functions (namely, the RCC function and the blind spot monitoring function in this example) from the OFF state to the ON state. In addition, in this case, the drive assistance ECU 20 starts to display "a changing notification screen 78b related to the operation starting suggestion processing" shown in FIG. 18 on the display 27 so as to notify the driver that each of the request states of the suggestion target functions have been switched to the ON state.

The changing notification screen 78b contains the back button 83h. When the driver selects the back button 83h, or when a state in which the back button 83h is not selected continues for the display time Td since/after the changing notification screen 78b was started to be displayed, the drive assistance ECU 20 starts to display the previous screen on the display 27.

Meanwhile, when the driver selects the denial button 90b while the changing confirmation screen 78a is being displayed, the drive assistance ECU 20 keeps the request states of the suggestion target functions in the OFF state. Furthermore, when a state in which neither the approval button 90a nor the denial button 90b is selected continues for the display time Td since/after the changing confirmation screen 78a was started to be displayed, the drive assistance ECU 20 keeps each of the request states of the suggestion target functions in the OFF state. In addition, in these cases, the drive assistance ECU 20 starts to display the previous screen on the display 27.

Specific Operation

Next, specific operation of the drive assistance ECU 20 with respect to the setting change confirmation processing will be described with reference to FIG. 19 to FIG. 22. The CPU of the drive assistance ECU 20 (hereinafter also referred to as "the CPU" for simplification) executes an "RCC starting confirmation processing routine" represented by a flowchart shown in FIG. 19 every time a predetermined time elapses.

Figure 11:
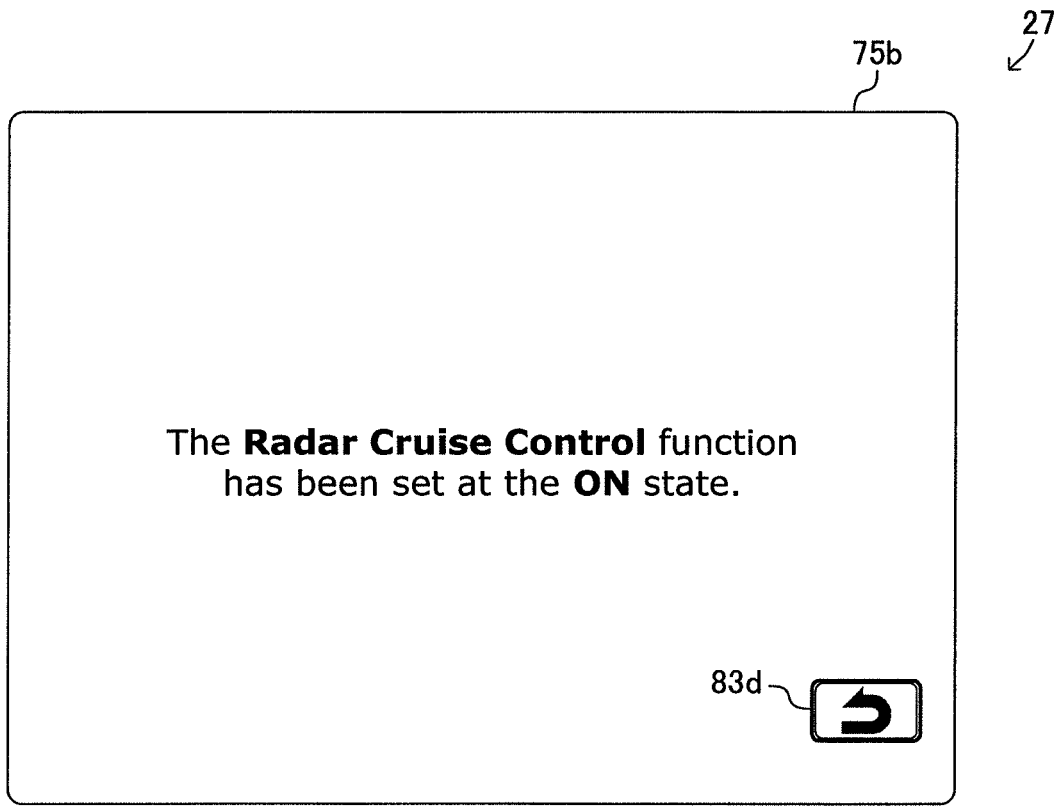
FIG. 11 is an illustration of a changing notification screen related to the RCC starting confirmation processing.
Figure 19:
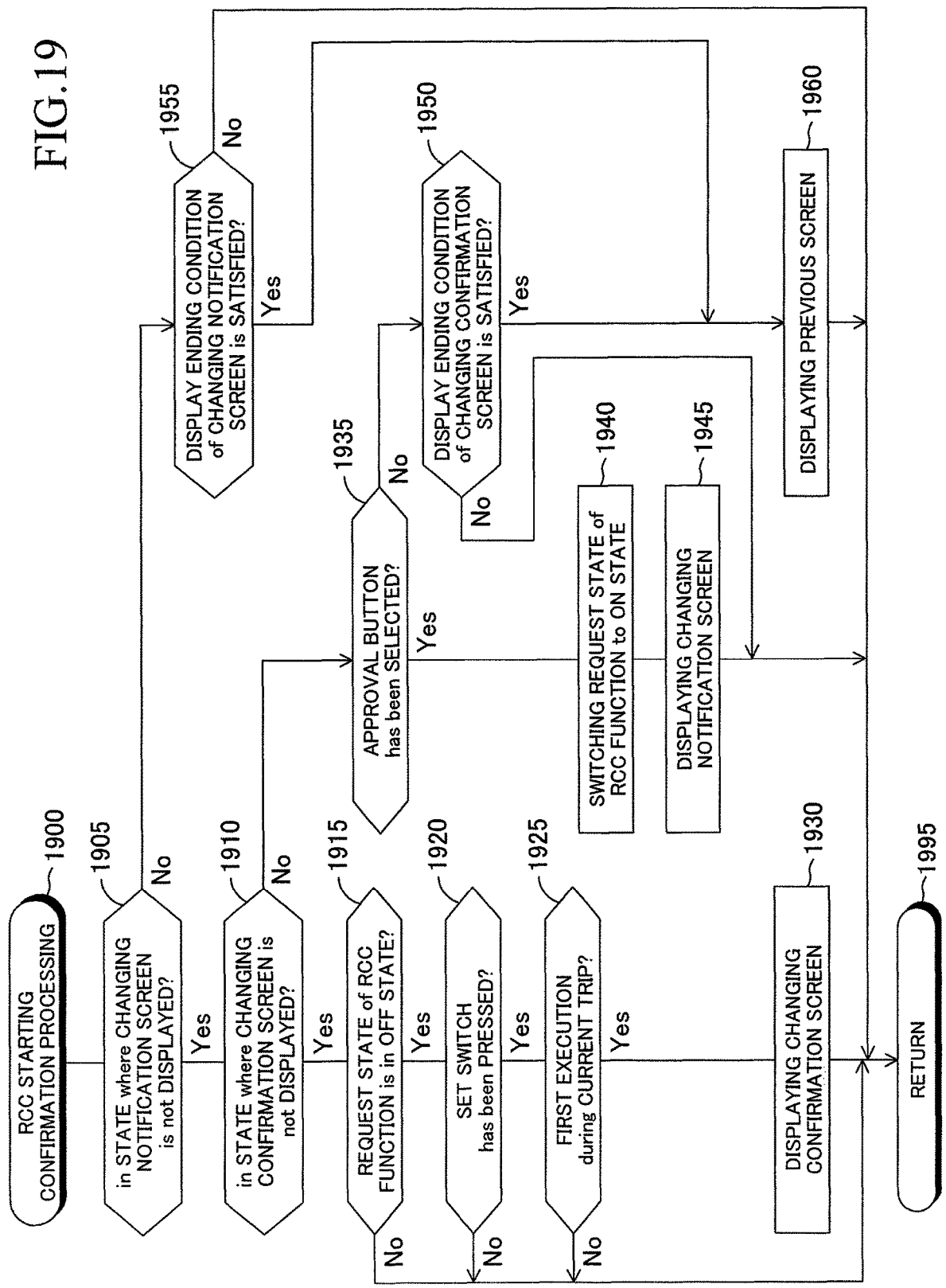
FIG. 19 is a flowchart representing an RCC starting confirmation processing routine executed by the present assisting apparatus.

Therefore, when an appropriate timing has come, the CPU starts the process from step 1900 of FIG. 19 and proceeds to step 1905 so as to determine whether or not the display state of the display 27 is a state where "the changing notification screen 75b related to the RCC starting confirmation processing" shown in FIG. 11 is not being displayed.

Case 1A

It is assumed that the request state of the RCC function is the OFF state, the top screen 71 is being displayed on the display 27, and the driver has not performed any operation to the CC switch 61 since the ignition-ON operation was performed.

According to this assumption, the display state of the display 27 is a state where the changing notification screen 75b is not being displayed, and thus, the CPU makes a "Yes" determination in/at step 1905 and proceeds to step 1910 so as to determine whether or not the display state of the display 27 is a state where the changing confirmation screen 75a shown in FIG. 10 related to the RCC starting confirmation processing is not being displayed.

According to the assumption described above, the display state of the display 27 is a state where the changing confirmation screen 75a is not being displayed, and thus, the CPU makes a "Yes" determination in step 1910 and proceeds to step 1915 so as to determine whether or not the request state of the RCC function is the OFF state. According to the assumption described above, the request state of the RCC function is the OFF state, and thus, the CPU makes a "Yes" determination in step 1915 and proceeds to step 1920 so as to determine whether or not the set switch of the CC switch 61 has been pressed since the present routine was executed last time (at previous timing).

According to the assumption described above, no operation to the CC switch 61 has been performed (namely, the set switch of the CC switch 61 has not been pressed), and thus, the CPU makes a "No" determination in step 1920 and proceeds to step 1995 directly so as to end the present routine.

Case 1B

It is assumed that the operation of pressing the set switch of the CC switch 61 was performed thereafter, and the present routine is being executed for the first time after the operation to the set switch of the CC switch 61 was performed. In addition, it is also assumed that the main switch of the CC switch 61 has not been pressed yet.

In this case, the CPU proceeds to step 1920, makes a "Yes" determination in step 1920, and proceeds to step 1925 so as to determine whether or not the process of step 1925 is being executed for the first time during the current trip.

According to the assumption described above, the set switch has been pressed for the first time during the current trip, and thus, the CPU makes a "Yes" determination in step 1925 and proceeds to step 1930 so as to display the changing confirmation screen 75a on the display 27. At this time, the CPU stores, as the previous screen, the screen which was displayed immediately before the changing confirmation screen 75a starts to be displayed (in the present assumption, the top screen 71) in the RAM of the drive assistance ECU 20. Subsequently, the CPU proceeds to step 1995.

Case 1C

It is assumed that, thereafter, the display time Td has not elapsed since the changing confirmation screen 75a was started to be displayed and neither the approval button 87a nor the denial button 87b of the changing confirmation screen 75a has been selected yet.

In this case, the CPU makes a "No" determination in step 1910 and proceeds to step 1935 so as to determine whether or not the approval button 87a has already been selected since the present routine was executed last time. According to the assumption described above, the approval button 87a has not been selected, and thus, the CPU makes a "No" determination in step 1935 and proceeds to step 1950 so as to determine whether or not a display ending condition of the changing confirmation screen 75a is satisfied.

The display ending condition of the changing confirmation screen 75a is a condition which is satisfied if at least one of "a condition (1a) and a condition (1b)" described below is satisfied.

Condition (1a): the denial button 87b is selected.
Condition (1b): the display time Td has elapsed since the changing confirmation screen 75a was started to be displayed.

According to the assumption described above, neither the condition (1a) nor the condition (1b) is satisfied, and thus, the display ending condition of the changing confirmation screen 75a is not satisfied. Therefore, the CPU makes a "No" determination in step 1950 and proceeds to step 1995 directly.

Case 1D

It is assumed that, thereafter, the approval button 87a of the changing confirmation screen 75a is selected before the display time Td has elapsed since the changing confirmation screen 75a was started to be displayed.

In this case, the CPU makes a "Yes" determination in step 1935 and proceeds to step 1940 so as to switch the request state of the RCC function from the OFF state to the ON state. Subsequently, the CPU proceeds to step 1945 so as to display the changing notification screen 75b on the display 27. Thereafter, the CPU proceeds to step 1995.

Case 1E

It is assumed that, thereafter, the display time Td has not elapsed yet since the changing notification screen 75b was started to be displayed, and the back button 83d of the changing notification screen 75b has not been selected.

In this case, the CPU makes a "No" determination in step 1905 and proceeds to step 1955 so as to determine whether or not a display ending condition of the changing notification screen 75b is satisfied. The display ending condition of the changing notification screen 75b is a condition which is satisfied if at least one of "a condition (1c) and a condition (1d)" described below is satisfied.

Condition (1c): the back button 83d is selected.
Condition (1d): the display time Td has elapsed since the changing notification screen 75b was started to be displayed.

According to the assumption described above, neither the condition (1c) nor the condition (1d) is satisfied, and thus, the display ending condition of the changing notification screen 75b is not satisfied. Therefore, the CPU makes a "No" determination in step 1955 and proceeds to step 1995 directly.

Thereafter, when the back button 83d is selected (namely, the condition (1c) becomes satisfied before the condition (1d) becomes satisfied), or when the display time Td has elapsed since the changing notification screen 75b was started to be displayed (namely, the condition (1d) become satisfied), the CPU makes a "Yes" determination in step 1955 and proceeds to step 1960 so as to display the previous screen (in the present assumption, the top screen 71) on the display 27. Thereafter, the CPU proceeds to step 1995.

Case 1F

It is assumed that, thereafter, the OFF operation of the RCC function was performed, the set switch of the CC switch 61 is pressed, but the main switch of the CC switch 61 has not been pressed. In addition, it is also assumed that the ignition-OFF operation has not been performed since the process of step 1930 was executed in the above-described Case 1B.

In this case, the CPU makes a "No" determination in step 1925 and proceeds to step 1995 directly. Namely, in this case, the RCC starting confirmation processing is not executed, and the request state of the RCC function is kept in the OFF state.

Case 1G

Next, it is assumed that the display ending condition of the changing confirmation screen 75a is satisfied (namely, at least one of "the condition (la) and the condition (1b)" described above is satisfied) while the changing confirmation screen 75a is being displayed.

In this case, the CPU makes a "Yes" determination in step 1950 and proceeds to step 1960. Namely, in this case, the request state of the RCC function is kept in the OFF state, and the previous screen starts to be displayed on the display 27.

Case 1H

Next, it is assumed that the request state of the RCC function is the ON state.

In this case, the CPU makes a "No" determination in step 1915 and proceeds to step 1995 directly.

It should be noted that if the ON operation of the RCC function is performed (namely, if the set switch of the CC switch 61 is pressed after the main switch of the CC switch 61 is pressed) while the request state of the RCC function is the OFF state, the CPU executes another routine (not shown) so as to switch the request state of the RCC function to the ON state.

Figure 20:
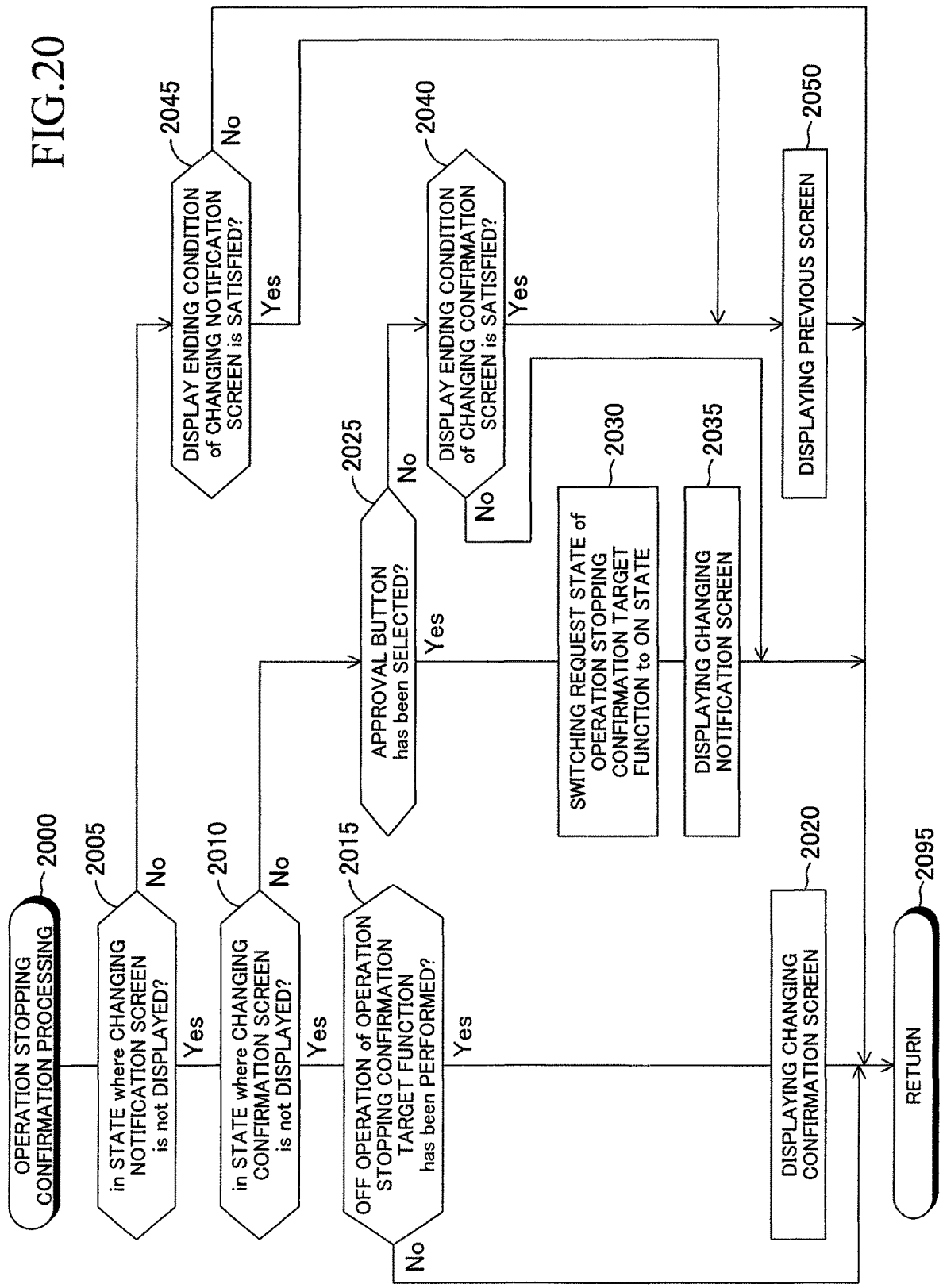
FIG. 20 is a flowchart representing an operation stopping confirmation processing routine executed by the present assisting apparatus.

Next, an "operation stopping confirmation processing routine" represented by a flowchart shown in FIG. 20 will be described. The CPU executes the present routine (the operation stopping confirmation processing routine) every time a predetermined time elapses. Therefore, when an appropriate timing has come, the CPU starts the process from step 2000 of FIG. 20 and proceeds to step 2005 so as to determine whether or not the display state of the display 27 is a state where the changing notification screen 76b (see FIG. 13) related to the operation stopping confirmation processing is not being displayed on the display 27.

Case 2A

It is assumed that the vehicle setting screen 72 (see FIG. 7) is being displayed on the display 27 at the present time, and the OFF operation of any one of the operation stopping confirmation target function(s) has not been performed.

According to this assumption, the changing notification screen 76b is not being displayed on the display 27, and thus, the CPU makes a "Yes" determination in step 2005 and proceeds to step 2010 so as to determine whether or not the display state of the display 27 is a state where the changing confirmation screen 76a (see FIG. 12) related to the operation stopping confirmation processing is not being displayed on the display 27.

According to the assumption described above, the display state of the display 27 is a state where the changing confirmation screen 75a is not being displayed, and thus, the CPU makes a "Yes" determination in step 2010 and proceeds to step 2015 so as to determine whether or not the OFF operation of the operation stopping confirmation target function has been performed since the present routine was executed last time. According to the assumption described above, the OFF operation of the operation stopping confirmation target function has not been performed, and thus, the CPU makes a "No" determination in step 2015 and proceeds to step 2095 directly so as to end the present routine.

Case 2B

It is assumed that, thereafter, the OFF operation of one of the operation stopping confirmation target function(s) has been performed, and the present routine is being executed for the first time after that OFF operation.

According to this assumption, the CPU makes a "Yes" determination in step 2015 and proceeds to step 2020 so as to display the changing confirmation screen 76a on the display 27. At this time, the CPU stores, as the previous screen, the screen which was displayed immediately before the changing confirmation screen 76a is started to be displayed (in the present assumption, the vehicle setting screen 72) in the RAM. Subsequently, the CPU proceeds to step 2095.

Case 2C

It is assumed that, thereafter, the display time Td has not elapsed since the changing confirmation screen 76a was started to be displayed and neither the approval button 88a nor the denial button 88b of the changing confirmation screen 76a has been selected yet.

In this case, the CPU makes a "No" determination in step 2010 and proceeds to step 2025 so as to determine whether or not the approval button 88a has already been selected since the present routine was executed last time. According to the assumption described above, the approval button 88a has not been selected, and thus, the CPU makes a "No" determination in step 2025 and proceeds to step 2040 so as to determine whether or not a display ending condition of the changing confirmation screen 76a is satisfied.

The display ending condition of the changing confirmation screen 76a is a condition which is satisfied if at least one of "a condition (2a) and a condition (2b)" described below is satisfied.

Condition (2a): the denial button 88b is selected.
Condition (2b): the display time Td has elapsed since the changing confirmation screen 76a was started to be displayed.

According to the assumption described above, neither the condition (2a) nor the condition (2b) is satisfied, and thus, the display ending condition of the changing confirmation screen 76a is not satisfied. Therefore, the CPU makes a "No" determination in step 2040 and proceeds to step 2095 directly.

Case 2D

It is assumed that, thereafter, the approval button 88a of the changing confirmation screen 76a is selected before the display time Td has elapsed since the changing confirmation screen 76a was started to be displayed.

In this case, the CPU makes a "Yes" determination in step 2025 and proceeds to step 2030 so as to switch the request state of "the operation stopping confirmation target function on which the OFF operation of was performed" from the ON state to the OFF state. Subsequently, the CPU proceeds to step 2035 so as to display the changing notification screen 76b related to the operation stopping confirmation processing on the display 27. Further, the CPU proceeds to step 2095.

Case 2E

It is assumed that, thereafter, the display time Td has not elapsed yet since the changing notification screen 76b was started to be displayed, and the back button 83e of the changing notification screen 76b has not been selected.

In this case, the CPU makes a "No" determination in step 2005 and proceeds to step 2045 so as to determine whether or not a display ending condition of the changing notification screen 76b is satisfied. The display ending condition of the changing notification screen 76b is a condition which is satisfied if at least one of "a condition (2c) and a condition (2d)" described below is satisfied.

Condition (2c): the back button 83e is selected.
Condition (2d): the display time Td has elapsed since the changing notification screen 76b was started to be displayed.

According to the assumption described above, neither the condition (2c) nor the condition (2d) is satisfied, and thus, the display ending condition of the changing notification screen 76b is not satisfied. Therefore, the CPU makes a "No" determination in step 2045 and proceeds to step 2095 directly.

Thereafter, when the back button 83e is selected (namely, the condition (2c) is satisfied before the condition (2d) is satisfied) or the display time Td has elapsed since the changing notification screen 76b was started to be displayed (namely, the condition (2d) is satisfied), the CPU makes a "Yes" determination in step 2045 and proceeds to step 2050 so as to display the previous screen (in the present assumption, the vehicle setting screen 72) on the display 27. Further, the CPU proceeds to step 2095.

Case 2F

Next, it is assumed that the display ending condition of the changing confirmation screen 76a is satisfied (namely, at least one of the above-described condition (2a) and the above-described condition (2b) is satisfied) while the changing confirmation screen 76a is being displayed.

In this case, the CPU makes a "Yes" determination in step 2040 and proceeds to step 2050. Namely, in this case, the request state of the operation stopping confirmation target function on which the OFF operation of was performed under the present assumption is kept in the ON state, and the previous screen is displayed on the display 27.

Figure 21:
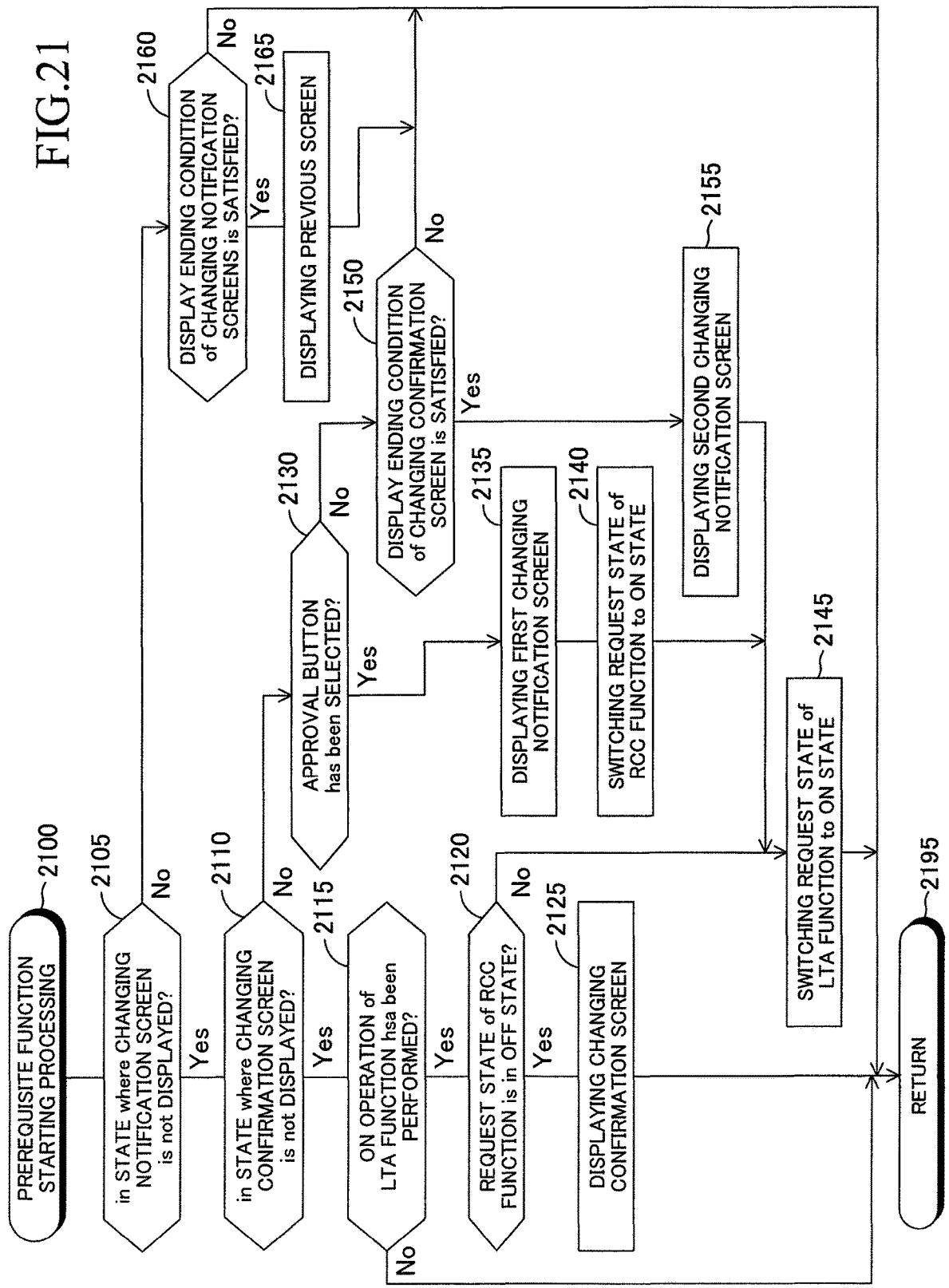
FIG. 21 is a flowchart representing a prerequisite function starting processing routine executed by the present assisting apparatus.

Next, a "prerequisite function starting processing routine" represented by a flowchart shown in FIG. 21 will be described. The CPU executes the present routine every time a predetermined time elapses. Therefore, when an appropriate timing has come, the CPU starts the process from step 2100 of FIG. 21 and proceeds to step 2105 so as to determine whether or not the display state of the display 27 is a state where neither the first changing notification screen 77b (see FIG. 15) nor the second changing notification screen 77c (see FIG. 16) related to the prerequisite function starting processing is being displayed on the display 27.

Case 3A

It is assumed that the top screen 71 is being displayed on the display 27, the request states of both the LTA function and the RCC function are the OFF state, and neither the ON operation of the LTA function nor the ON operation of the RCC function has been performed at the present time.

According to this assumption, neither the first changing notification screen 77b nor the second changing notification screen 77c is being displayed on the display 27, and thus, the CPU makes a "Yes" determination in step 2105 and proceeds to step 2110 so as to determine whether or not the display state of the display 27 is a state where the changing confirmation screen 77a related to the prerequisite function starting processing (see FIG. 14) is not being displayed on the display 27.

According to the assumption described above, the display state of the display 27 is a state where the changing confirmation screen 77a is not being displayed, and thus, the CPU makes a "Yes" determination in step 2110 and proceeds to step 2115 so as to determine whether or not the ON operation of the LTA function has been performed since the present routine was executed last time. According to the assumption described above, the ON operation of the LTA function has not been performed, and thus, the CPU makes a "No" determination in step 2115 and proceeds to step 2195 directly so as to end the present routine.

Case 3B

It is assumed that, thereafter, the ON operation of the LTA function is performed, and the present routine is being executed for the first time after the ON operation.

According to this assumption, the CPU makes a "Yes" determination in step 2115 and proceeds to step 2120 so as to determine whether or not the request state of the RCC function is the OFF state. According to the assumption described above, the request state of the RCC function is the OFF state, and thus, the CPU makes a "Yes" determination in step 2120 and proceeds to step 2125 so as to display the changing confirmation screen 77a on the display 27. At this time, the CPU stores, as the previous screen, the screen which was displayed immediately before the changing confirmation screen 77a is started to be displayed (in the present assumption, the top screen 71) in the RAM. Subsequently, the CPU proceeds to step 2195.

Case 3C

It is assumed that, thereafter, the display time Td has not elapsed since the changing confirmation screen 77a was started to be displayed and neither the approval button 89a nor the denial button 89b of the changing confirmation screen 77a has been selected yet.

In this case, the CPU makes a "No" determination in step 2110 and proceeds to step 2130 so as to determine whether or not the approval button 89a has already been selected since the present routine was executed last time. According to the assumption described above, the approval button 89*a* has not been selected, and thus, the CPU makes a "No" determination in step 2130 and proceeds to step 2150 so as to determine whether or not a display ending condition of the changing confirmation screen 77*a* is satisfied.

The display ending condition of the changing confirmation screen 77*a* is a condition which is satisfied if at least one of "a condition (3*a*) and a condition (3*b*)" described below is satisfied.

Condition (3*a*): the denial button 89*b* is selected.

Condition (3*b*): the display time Td has elapsed since the changing confirmation screen 77*a* was started to be displayed.

According to the assumption described above, neither the condition (3*a*) nor the condition (3*b*) is satisfied, and thus, the display ending condition of the changing confirmation screen 77*a* is not satisfied. Therefore, the CPU makes a "No" determination in step 2150 and proceeds to step 2195 directly.

Case 3D

It is assumed that, thereafter, the approval button 89*a* of the changing confirmation screen 77*a* is selected before the display time Td has elapsed since the changing confirmation screen 77*a* was started to be displayed.

In this case, the CPU makes a "Yes" determination in step 2130 and proceeds to step 2135 so as to display the first changing notification screen 77*b* related to the prerequisite function starting processing on the display 27. Subsequently, the CPU proceeds to step 2140 so as to switch the request state of the RCC function to the ON state. In addition, the CPU proceeds to step 2145 so as to switch the request state of the LTA function to the ON state. Thereafter, the CPU proceeds to step 2195.

Case 3E

It is assumed that, thereafter, the display time Td has not elapsed yet since the first changing notification screen 77*b* was started to be displayed, and the back button 83*f* of the first changing notification screen 77*b* has not been selected.

In this case, the CPU makes a "No" determination in step 2105 and proceeds to step 2160 so as to determine whether or not a display ending condition of the first changing notification screen 77*b* and the second changing notification screen 77*c* is satisfied. The display ending condition of the first changing notification screen 77*b* and the second changing notification screen 77*c* is a condition which is satisfied if at least one of "a condition (3*c*) and a condition (3*d*)" described below is satisfied.

Condition (3*c*): the back button 83*f* or the back button 83*g* is selected.

Condition (3*d*): the display time Td has elapsed since either the first changing notification screen 77*b* or the second changing notification screen 77*c* was started to be displayed.

According to the assumption described above, neither the condition (3*c*) nor the condition (3*d*) is satisfied, and thus, the display ending condition of the first changing notification screen 77*b* and the second changing notification screen 77*c* is not satisfied. Therefore, the CPU makes a "No" determination in step 2160 and proceeds to step 2195 directly.

Thereafter, when the back button 83*f* is selected (namely, the condition (3*c*) is satisfied before the condition (3*d*) is satisfied) or the display time Td has elapsed since the first changing notification screen 77*b* was started to be displayed (namely, the condition (3*d*) is satisfied), the CPU makes a "Yes" determination in step 2160 and proceeds to step 2165 so as to display the previous screen (in the present assumption, the top screen 71) on the display 27. Thereafter, the CPU proceeds to step 2195.

Case 3F

Next, it is assumed that the display ending condition of the changing confirmation screen 77*a* is satisfied (namely, at least one of the above-described condition (3*a*) and the above-described condition (3*b*) is satisfied) while the changing confirmation screen 77*a* is being displayed.

In this case, the CPU makes a "Yes" determination in step 2150 and proceeds to step 2155 so as to display the second changing notification screen 77*c* on the display 27. Subsequently, the CPU proceeds to step 2145, and then, proceeds to step 2195. Namely, in this case, the request state of the RCC function is kept in the OFF state without being switched to the ON state, while the request state of the LTA function is switched from the OFF state to the ON state.

Case 3G

Next, it is assumed that the top screen 71 is being displayed on the display 27, the request state of the RCC function has been the ON state, and the ON operation of the LTA function has been performed.

According to this assumption, the CPU makes a "No" determination in step 2120 and proceeds to step 2145.

Figure 22:
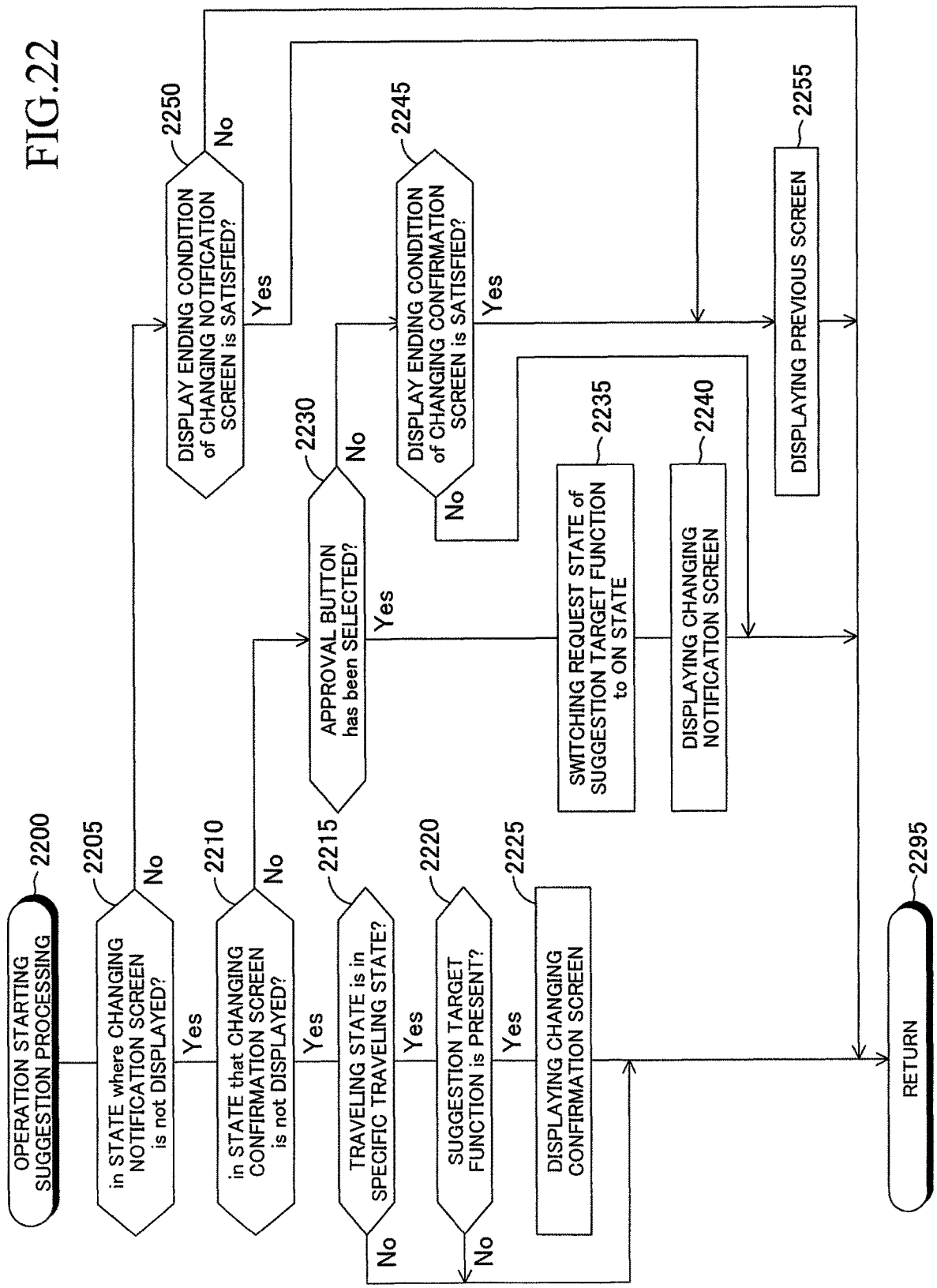
FIG. 22 is a flowchart representing an operation starting suggestion processing routine executed by the present assisting apparatus.

Next, an "operation starting suggestion processing routine" represented by a flowchart shown in FIG. 22 will be described. The CPU executes the present routine every time a predetermined time elapses. Therefore, when an appropriate timing has come, the CPU starts the process from step 2200 of FIG. 22 and proceeds to step 2205 so as to determine whether or not the display state of the display 27 is a state where the changing notification screen 78*b* (see FIG. 18) related to the operation starting suggestion processing is not being displayed on the display 27.

Case 4A

It is assumed that the vehicle setting screen 72 is being displayed on the display 27, each of the request states of both the RCC function and the blind spot monitoring function has been the OFF state, the request state of the LTA function has been the ON state, and the traveling state of the vehicle 10 is not being the specific traveling state.

According to this assumption, the changing notification screen 78*b* is not being displayed on the display 27, and thus, the CPU makes a "Yes" determination in step 2205 and proceeds to step 2210 so as to determine whether or not the display state of the display 27 is a state where the changing confirmation screen 78*a* (see FIG. 17) related to the operation starting suggestion processing is not being displayed on the display 27.

According to the assumption described above, the display state of the display 27 is the state where the changing confirmation screen 78*a* is not being displayed, and thus, the CPU makes a "Yes" determination in step 2210 and proceeds to step 2215 so as to determine whether or not the traveling state of the vehicle 10 is the specific traveling state. According to the assumption described above, the traveling state of the vehicle 10 is not being the specific traveling state, and thus, the CPU makes a "No" determination in step 2215 and proceeds to step 2295 directly so as to end the present routine.

Case 4B

It is assumed that, thereafter, the traveling state of the vehicle 10 has become the specific traveling state, and the present routine is being executed for the first time after the change of the traveling state.

According to this assumption, the CPU makes a "Yes" determination in step 2215 and proceeds to step 2220 so as to determine whether or not the suggestion target function(s) is/are present. According to the assumption described above, the RCC function and the blind spot monitoring function fall into the suggestion target functions.

Therefore, the CPU makes a "Yes" determination in step 2220 and proceeds to step 2225 so as to display the changing confirmation screen 78a on the display 27. At this time, the CPU stores, as the previous screen, the screen which was displayed immediately before the changing confirmation screen 78a is started to be displayed (in the present assumption, the vehicle setting screen 72) in the RAM. Subsequently, the CPU proceeds to step 2295.

Case 4C

It is assumed that, thereafter, the display time Td has not elapsed since the changing confirmation screen 78a was started to be displayed and neither the approval button 90a nor the denial button 90b of the changing confirmation screen 78a has been selected yet.

In this case, the CPU makes a "No" determination in step 2210 and proceeds to step 2230 so as to determine whether or not the approval button 90a has already been selected since the present routine was executed last time. According to the assumption described above, the approval button 90a has not been selected, and thus, the CPU makes a "No" determination in step 2230 and proceeds to step 2245 so as to determine whether or not a display ending condition of the changing confirmation screen 78a is satisfied.

The display ending condition of the changing confirmation screen 78a is a condition which is satisfied if at least one of "a condition (4a) and a condition (4b)" described below is satisfied.

Condition (4a): the denial button 90b is selected.

Condition (4b): the display time Td has elapsed since the changing confirmation screen 78a was started to be displayed.

According to the assumption described above, neither the condition (4a) nor the condition (4b) is satisfied, and thus, the display ending condition of the changing confirmation screen 78a is not satisfied. Therefore, the CPU makes a "No" determination in step 2245 and proceeds to step 2295 directly.

Case 4D

It is assumed that, thereafter, the approval button 90a of the changing confirmation screen 78a is selected before the display time Td has elapsed since the changing confirmation screen 78a was started to be displayed.

In this case, the CPU makes a "Yes" determination in step 2230 and proceeds to step 2235 so as to switch the request state(s) of the suggestion target function(s) (in the present assumption, the RCC function and the blind spot monitoring function) from the OFF state to the ON state.

Subsequently, the CPU proceeds to step 2240 so as to display the changing notification screen 78b related to the operation starting suggestion processing on the display 27. Further, the CPU proceeds to step 2295.

Case 4E

It is assumed that, thereafter, the display time Td has not elapsed yet since the changing notification screen 78b was started to be displayed, and the back button 83h of the changing notification screen 78b has not been selected.

In this case, the CPU makes a "No" determination in step 2205 and proceeds to step 2250 so as to determine whether or not a display ending condition of the changing notification screen 78b is satisfied. The display ending condition of the changing notification screen 78b is a condition which is satisfied if at least one of "a condition (4c) and a condition (4d)" described below is satisfied.

Condition (4c): the back button 83h is selected.

Condition (4d): the display time Td has elapsed since the changing notification screen 78b was started to be displayed.

According to the assumption described above, neither the condition (4c) nor the condition (4d) is satisfied, and thus, the display ending condition of the changing notification screen 78b is not satisfied. Therefore, the CPU makes a "No" determination in step 2250 and proceeds to step 2295 directly.

Thereafter, when the back button 83h is selected (namely, the condition (4c) is satisfied before the condition (4d) is satisfied) or the display time Td has elapsed since the changing notification screen 78b was started to be displayed (namely, the condition (4d) is satisfied), the CPU makes a "Yes" determination in step 2250 and proceeds to step 2255 so as to display the previous screen (in the present assumption, the vehicle setting screen 72) on the display 27. Thereafter, the CPU proceeds to step 2295.

Case 4F

Next, it is assumed that the display ending condition of the changing confirmation screen 78a is satisfied (namely, at least one of the above-described condition (4a) and the above-described condition (4b) is satisfied) while the changing confirmation screen 78a is being displayed.

In this case, the CPU makes a "Yes" determination in step 2245 and proceeds to step 2255. Namely, in this case, the request state(s) of the suggestion target function(s) is/are kept in the OFF state and the previous screen is started to be displayed on the display 27.

Case 4G

Next, it is assumed that there is no suggestion target function when the traveling state of the vehicle 10 becomes the specific traveling state.

In this case, the CPU makes a "No" determination in step 2220 and proceeds to step 2295 directly.

Modification of Embodiment

Next, a modification of the embodiment will be described. The present modification is different from the above-described embodiment only in that the main switch of the CC switch 61 is omitted and the ON operation of the RCC function is pressing the set switch of the CC switch 61.

When the set switch of the CC switch 61 is pressed while the request state of the RCC function has been the OFF state, the drive assistance ECU 20 displays the changing confirmation screen 75*a* (see FIG. 10) related to the RCC starting confirmation processing on the display 27. Namely, the drive assistance ECU 20 starts the RCC starting confirmation processing related to the present modification.

In the present modification, the changing confirmation screen 75*a* contains a description which explains that the request state of the RCC function will be switched to the ON state if the approval button 87*a* is selected.

When the approval button 87*a* is selected before the display time Td elapses since the changing confirmation screen 75*a* was displayed, the drive assistance ECU 20 switches the request state of the RCC function to the ON state. In addition, the drive assistance ECU 20 displays the changing notification screen 75*b* (see FIG. 11) related to the RCC starting confirmation processing on the display 27.

As described above, the drive assistance ECU 20 can prevent (avoid), by executing the setting change confirmation processing, the occurrence of erroneous setting of the request states of the driving assistance functions, which erroneous setting would otherwise occur due to the driver's erroneous operation or misunderstanding. More specifically, according to the RCC starting confirmation processing, in a case where the driver performs the similar operation (in the present embodiment, the operation of pressing the set switch of the CC switch 61 without pressing the main switch of the CC switch 61), the request state of the RCC function can be easily switched from the OFF state to the ON state.

In addition, according to the operation stopping confirmation processing, erroneously changing of the request state of the operation stopping confirmation target function to the OFF state can be avoided. According to the prerequisite function starting processing, in a case where the driver has forgotten (failed) to switch the request state of the prerequisite function to the ON state or in a case where the driver does not know the presence of the prerequisite function, the request state of the prerequisite function can be easily switched from the OFF state to the ON state.

Further, according to the operation starting suggestion processing, in a case where the driver has forgotten (failed) to switch the request state of the suggestion target function (specifically, the traveling state related function) to the ON state or in a case where the driver does not understand the usefulness of the suggestion target function, the request state of the suggestion target function can be easily switched from the OFF state to the ON state.

Further, since the RCC starting confirmation processing is executed only once in the same (single) trip, it is possible to avoid a situation in which the changing confirmation screen (namely, the changing confirmation screen 75*a* shown in FIG. 10) is repeatedly displayed for the driver who has already understood the ON operation of the RCC function by (through) the changing confirmation screen. Namely, it is possible to avoid a situation in which "the driver who has erroneously pressed the set switch of the CC switch 61 without pressing the main switch of the CC switch 61 when the request state of the RCC function was the OFF state" feels a sense of bother or troublesome due to repetition of executing the RCC starting confirmation processing.

Although the embodiment and the modification of the changing operation assisting apparatus according to the present disclosure have been described, the present disclosure is not limited to the above-described embodiment and the modification, and may be changed in various ways without departing from the scope of the present disclosure. For example, the drive assistance ECU 20 according to the present embodiment executes the RCC starting confirmation processing, the operation stopping confirmation processing, the prerequisite function starting processing, and the operation starting suggestion processing as the setting change confirmation processing. However, the drive assistance ECU 20 may be configured not to execute a part of the setting change confirmation processing.

In addition, in the present embodiment, the drive assistance ECU 20 executes the RCC starting confirmation processing when the driver presses the set switch of the CC switch 61 without pressing the main switch of the CC switch 61 while the request state of the RCC function has been the OFF state. Namely, the drive assistance ECU 20 confirms with the driver whether to switch the request state of the RCC function from the OFF state to the ON state when the predetermined "similar operation" corresponding to the ON operation of the RCC function is performed. Meanwhile, the drive assistance ECU 20 may be configured to execute a setting change confirmation processing similar to the RCC starting confirmation processing for the other driving assistance function than the RCC function. For example, if the ON operation of the LTA function consists of pressing a "basic switch" which is not shown and pressing the LTA switch 64 before a predetermined time has elapsed after the press of the basic switch, the drive assistance ECU 20 may be configured to confirm with the driver whether to switch the request state of the LTA function to the ON state by displaying a changing confirmation screen similar to the changing confirmation screen 75*a* shown in FIG. 10 on the display 27 when the LTA switch 64 is pressed while the basic switch has not been pressed and the request state of the LTA function has been the OFF state.

In addition, in the present embodiment, the drive assistance ECU 20 executes the RCC starting confirmation processing only once in the same (single) trip. Whereas, the drive assistance ECU 20 may be configured to execute the RCC starting confirmation processing a plurality of times in the same (single) trip. Furthermore, the drive assistance ECU 20 may be configured to execute the other setting change confirmation processing than the RCC starting confirmation processing only once in the same (single) trip.

In addition, in the present embodiment, the confirmation information is provided through the changing confirmation screens displayed on the display 27. However, the confirmation information may be provided by another method than using the changing confirmation screens. For example, the confirmation information may be provided through a voice message reproduced by the speaker 28. Furthermore, in the present embodiment, the approving operation is the operation to the operation switches 60. However, the approving operation may be different from these kinds of operation. For example, the approving operation may be an operation which is achieved when the driver says "a word or a phrase indicating approval" to a microphone which is not shown and connected to the drive assistance ECU 20.

In addition, in the present embodiment, the drive assistance ECU 20 switches the request state of the LTA function from the OFF state to the ON state if the approval button 89*a* is not selected in the period in which the prerequisite function starting processing is being executed (specifically, if the display ending condition of the changing confirmation screen 77*a* is satisfied). However, the drive assistance ECU 20 may be configured not to switch the request state of the LTA function from the OFF state to the ON state when the display ending condition of the changing confirmation screen 77*a* is satisfied. Namely, in this case, each of the request states of both the LTA function and the RCC function may be kept in the OFF state.

In addition, in the present embodiment, the specific traveling state related to the operation starting suggestion processing is a state in which the vehicle 10 is traveling on the expressway or the limited highway. Furthermore, in the present embodiment, the traveling state related functions related to the operation starting suggestion processing are the driving assistance functions which are marked with the white circle in the column Cm2 of the table shown in FIG. 5. However, the specific traveling state and the traveling state related functions may be different from what are described above. For example, the drive assistance ECU 20 may be configured to determine that the traveling state of the vehicle 10 is the specific traveling state when the present position Pn is on/in the "facility." In this case, the traveling state related functions may be the driving assistance functions which are marked with a white circle in a column Cm3 of the table shown in FIG. 5 (namely, the clearance sonar function, the rear cross traffic alarm function, and the parking support brake function).

In addition, in the present embodiment, the drive assistance ECU 20 executes the prerequisite function starting processing, when the driver performs the ON operation of the LTA function while the request state of the RCC function has been the OFF state. However, the combination of the driving assistance functions (in the present embodiment, the LTA function and the RCC function which is the prerequisite function) which induces the drive assistance ECU 20 to execute the prerequisite function starting processing may be different from those described. For example, the combination of the driving assistance functions which induces the drive assistance ECU 20 to execute the prerequisite function starting processing may be a combination of the RCC function and an "inter-vehicle communication function" which is the prerequisite function. In this case, when the driver performs the ON operation of the RCC function while the request state of the inter-vehicle communication function has been the OFF state, the drive assistance ECU 20 executes the setting change confirmation processing (namely, the prerequisite function starting processing) in order to confirm with the driver whether or not the request state of the inter-vehicle communication function in addition to the request state of the RCC function is to be switched to the ON state.

Notably, the inter-vehicle communication function is a well-known function for receiving information regarding a traveling state (traveling information) from an other vehicle which transmits the traveling information of the other vehicle and transmitting the traveling information to the other vehicle by wireless communication. In this case, when the request states of both the RCC function and the inter-vehicle communication function are the ON state and the vehicle 10 receives the traveling information from the following target vehicle, the drive assistance ECU 20 can determine the target acceleration Astg with reference to the traveling information of the following target vehicle. And thus, the vehicle 10 can quickly follows a change in the traveling speed of the following target vehicle.

What is claimed is:

1. A changing operation assisting apparatus comprising:
a driving assistance control processor configured to store a set state associated with each driving assistance function of a plurality of driving assistance functions of a vehicle, wherein the set state associated with each driving assistance function includes a request state which is either in an OFF state or an ON state, and wherein the driving assistance control processor is further configured to provide the plurality of driving assistance functions in accordance with respective set states;
an operation processor which is used for an operation by a driver of said vehicle for changing the set state of a driving assistance function, wherein the operation processor is configured to provide information regarding the operation performed by the driver, wherein the operation includes a predetermined request state changing operation to change the request state of the driving assistance function; and
an information providing processor controlled by the driving assistance control processor and configured to provide information regarding the set state to the driver;
wherein the driving assistance control processor executes a setting change confirmation processing in response to determining that the driver has performed a specific operation relevant to change of the request state of a confirmation target function among the plurality of driving assistance functions;
wherein the setting change confirmation processing comprises controlling the information providing processor to provide, to the driver, confirmation information to confirm whether to change the request state of the confirmation target function, and wherein the setting change confirmation processing further comprises changing the request state of the confirmation target function when the driver performs a predetermined approving operation in accordance with said confirmation information; and
wherein the specific operation is a second operation which is an operation relevant to change of the request state of the confirmation target function, and wherein the second operation is different from a first operation, and wherein the first operation changes the request state of the confirmation target function to the ON state.

2. The changing operation assisting apparatus according to claim 1, wherein the driving assistance control processor is further configured to not execute the setting change confirmation processing again before an ignition-OFF operation of said vehicle is performed, when the setting change confirmation processing has been executed after an ignition-ON operation of the vehicle is performed, even when the driver has performed the specific operation.

* * * * *